United States Patent
Kuo et al.

(10) Patent No.: US 10,789,513 B2
(45) Date of Patent: Sep. 29, 2020

(54) SURVEILLANCE SYSTEM AND SURVEILLANCE METHOD USING MULTI-DIMENSIONAL SENSOR DATA

(71) Applicant: Wistron Corp., New Taipei (TW)

(72) Inventors: Fang-Wen Kuo, New Taipei (TW); Chih-Ming Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 83 days.

(21) Appl. No.: 16/199,104

(22) Filed: Nov. 23, 2018

(65) Prior Publication Data

US 2020/0012883 A1    Jan. 9, 2020

(30) Foreign Application Priority Data

Jul. 3, 2018    (TW) .............................. 107122943 A

(51) Int. Cl.
*G06K 9/62*    (2006.01)
*G06K 9/00*    (2006.01)

(52) U.S. Cl.
CPC ......... *G06K 9/629* (2013.01); *G06K 9/00771* (2013.01); *G06K 9/6289* (2013.01)

(58) Field of Classification Search
CPC .. G06K 9/629; G06K 9/00771; G06K 9/6289; G08B 29/188; G08B 13/196
USPC ........................................................ 382/103
See application file for complete search history.

(56) References Cited

U.S. PATENT DOCUMENTS

2006/0222209 A1* 10/2006 Zhang ................ G06K 9/00771
382/107
2015/0009031 A1* 1/2015 Bedros ................ G08B 13/122
340/566

FOREIGN PATENT DOCUMENTS

TW    M482134 U    7/2014

* cited by examiner

*Primary Examiner* — Amandeep Saini

(57) ABSTRACT

A surveillance method using multi-dimensional sensor data for use in a surveillance system is provided. The surveillance system includes a plurality of sensors installed within a scene, and the plurality of sensor are classified into a plurality of types. The surveillance method includes the steps of: obtaining each type of sensor data from the scene using the sensors; performing a local-object process on each type of sensor data to generate local-object-feature information for each type; performing a global-object process according to the local-object-feature information of each type to generate global-object-feature information; and performing a global-object recognition process on the global-object-feature information to generate a global-recognition result.

18 Claims, 23 Drawing Sheets

SURVEILLANCE SYSTEM AND SURVEILLANCE METHOD USING MULTI-DIMENSIONAL SENSOR DATA

CROSS REFERENCE TO RELATED APPLICATIONS

This application claims priority of Taiwan Patent Application No. 107122943, filed on Jul. 3, 2018, the entirety of which is incorporated by reference herein.

BACKGROUND OF THE DISCLOSURE

Field of the Disclosure

The disclosure relates to a surveillance system, and, in particular, to a surveillance system and a surveillance method using multi-dimensional sensor data.

Description of the Related Art

Video surveillance systems and video cameras have been widely used in homes, private areas, public places, and roadways to monitor these regions and record video to potentially serve as evidence. This, in large part, satisfies the need to protect private and public property, to provide traffic safety for vehicles, and to prevent criminals from striking. Conventional video surveillance systems are only capable of repeatedly recording videos, however, and after a long time period, a huge amount of video data can be generated by video cameras that are widely installed. When an event of interest occurs, it may not be discovered and dealt with in time. In addition, a lot of human resources and time are required to retrieve and inspect the recorded videos.

However, under practical conditions, complete information about the environment cannot be obtained using only video cameras. For example, when a fire, or an oil or gas leak happens, the fire or leak may be in an unobservable place and may not be detected before the fire or leak spreads. Thus, if an unusual smell can be detected in the air, it may be possible to detect a disaster being it happens. Accordingly, sensors of a single type have a very limited capability for monitoring and maintaining security.

BRIEF SUMMARY OF THE DISCLOSURE

A detailed description is given in the following embodiments with reference to the accompanying drawings.

In an exemplary embodiment, a surveillance method using multi-dimensional sensor data for use in a surveillance system is provided. The surveillance system includes a plurality of sensors installed within a scene, and the plurality of sensors are classified into a plurality of types. The surveillance method includes the steps of: obtaining each type of sensor data about the scene using the sensors; performing a local-object process on each type of sensor data to generate local-object-feature information for each type; performing a global-object process according to the local-object-feature information of each type to generate global-object-feature information; and performing a global-object recognition process on the global-object-feature information to generate a global-recognition result.

In another exemplary embodiment, a surveillance system is provided. The surveillance system includes: a plurality of sensors and a computation apparatus. The plurality of sensors are classified into a plurality of types and are configured to monitor a scene to obtain sensor data of each type. The computation apparatus is configured to perform a local-object process on each type of sensor data to generate local-object-feature information. The computation apparatus performs a global-object process according to the local-object-feature information of each type to generate global-object-feature information, and performs a global-object recognition process on the global-object-feature information to generate a global-recognition result.

BRIEF DESCRIPTION OF THE DRAWINGS

The disclosure can be more fully understood by reading the subsequent detailed description and examples with references made to the accompanying drawings, wherein:

FIGS. 8C-1 and 8C-2 are portions of a flow chart of the global-detail-feature fusion and global-object recognition in accordance with an embodiment of the disclosure;

FIGS. 9A-1 and 9A-2 are portions of a block diagram of a surveillance method in accordance with an embodiment of the disclosure;

FIGS. 9B-1 and 9B-2 are portions of a detailed block diagram of the global-context analysis process in accordance with the embodiment of FIGS. 9A-1 and 9A-2;

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

Figure 1:
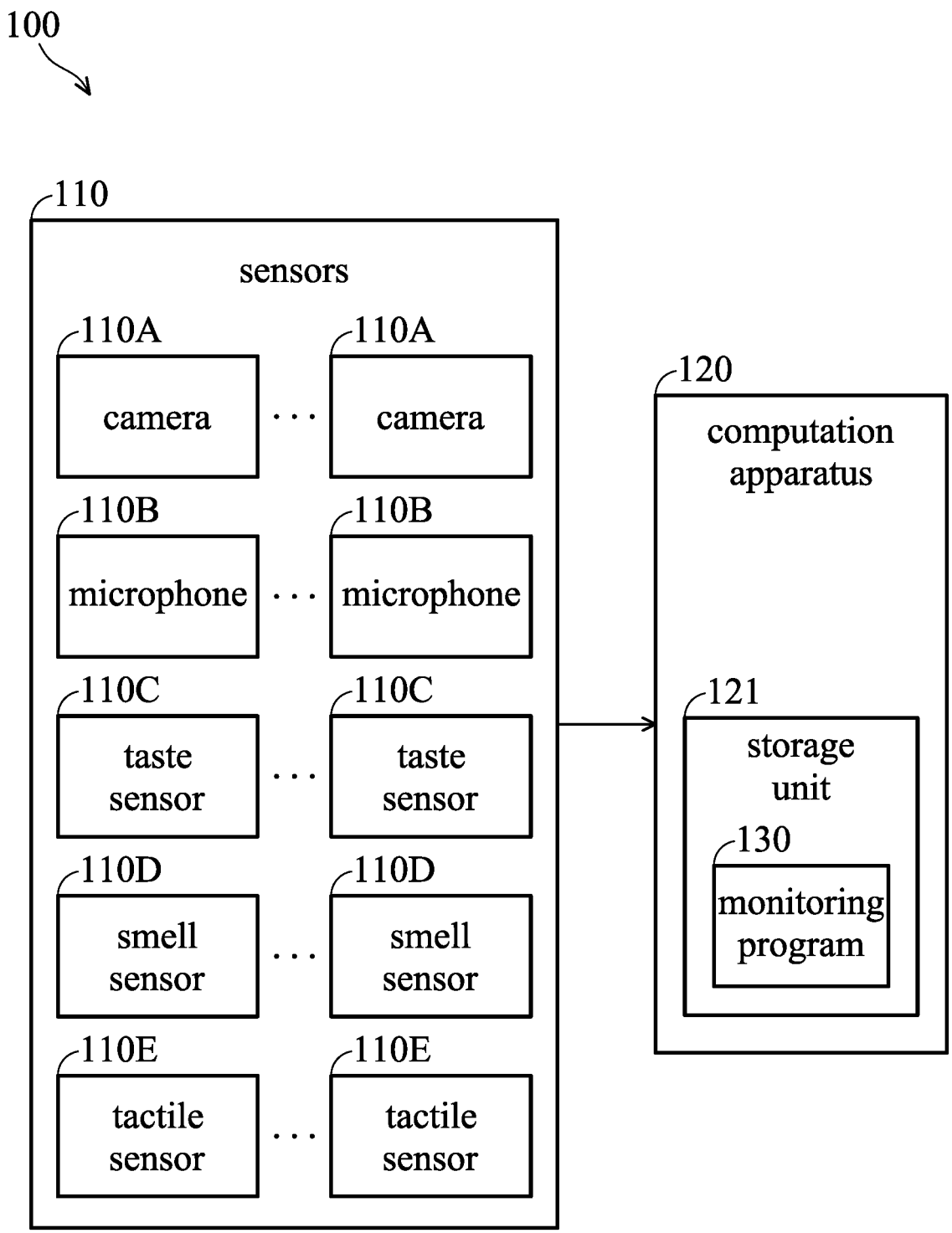
FIG. 1 is a block diagram of a surveillance system in accordance with an embodiment of the disclosure.

FIG. 1 is a block diagram of a surveillance system in accordance with an embodiment of the disclosure.

As depicted in FIG. 1, the surveillance system 100 includes a plurality of sensors 110, one or more computation apparatuses 120.

In an embodiment, the sensors 110 includes various types of sensors such as cameras 110A, microphones 110B, taste sensors 110C, smell sensors 110D, tactile sensors 110E, or a combination thereof, the following embodiments of the present disclosure are not limited to the sensors of the above-mentioned types or attributes, and the number of sensors of each type or attribute may be adjusted according to practical conditions. The different types of sensors 110 may correspond to the five human senses. For example, cameras 110A correspond to eyes and are configured to capture video images; microphones 110B correspond to ears and are configured to capture acoustic signals; taste sensors 110C (e.g., electronic tongues) correspond to the tongue and are configured to detect sour, sweet, bitter, spicy, or salty tastes of objects; smell sensors 110D (e.g., electronic noses) correspond to the nose and are configured to detect smells in the air; tactile sensors 110E (e.g., electronic skins) correspond to bodies and are configured to detect the pressure or temperature of touch events. Specifically, the sensor data obtained from each type of sensor can be regarded as data in one dimension, and the surveillance system 100 in the present disclosure may use sensor data from various types of sensors.

In some embodiments, the cameras 110A corresponding to eyes may include different types of cameras. For example, the cameras 110A may be color cameras for capturing color images (e.g., RGB images) of a scene. The cameras 110A may be depth cameras for capturing depth images (e.g., gray images) of a scene. Alternatively, the cameras 110A may be infrared sensors for detecting radiation energy in the scene and converting the detected radiation energy to electrical signals that are shown as an infrared thermal image with different colors indicating different temperatures. For purposes of description, the cameras 110A are color cameras in the following embodiments.

The computation apparatus 120 may be one or more personal computers, servers, or a central data processing center, and configured to run a monitoring program 130 using multi-dimensional sensor data, wherein the monitoring program 130, for example, may be stored in a storage unit 121 of the computation apparatus 120. The storage unit 121 may be a non-volatile memory such as a hard disk drive (HDD), a solid-state disk (SSD), or a read-only memory (ROM), but the disclosure is not limited thereto. The computation apparatus 120 runs the monitoring program 130 to receive the sensor data from the different types of sensors 110, and performs the functions of local object recognition (LOR), local object feature extraction and fusion, feature information feedback and enhancement, and global recognition, and the details of these functions are described below.

In an embodiment, the cameras 110A, microphones 110B, taste sensor 110C, smell sensors 110D, and tactile sensors 110E correspond to detection and recognition of objects in the sensor modes of eyes, ears, noses, tongues, and bodies, respectively. However, the extracted object features for the object detection are different from those for the object recognition. For example, the object detection may use rough features, and the object recognition may use detail features. For example, the rough features may include directions, distances, roughness, or structures, but the disclosure is not limited thereto. The detail features may be classified according to sensor type. The video detail features may include colors, textures, and shapes; the acoustic detail features may include sound volumes, sound pitches, and tones; the smell detail features may include aromatic, spoiled, etheric, spicy, charred, and resinous smells; the taste detail features may include: sweet, salty, sour, bitter, spicy, and fresh tastes; and the tactile detail features may include pressure and temperature, but the disclosure is not limited thereto.

For example, the rough structure feature of an object can be used to describe the outline of the object, such as a cylindrical barrel, a rectangular standing sign, a person, a vehicle, or a motorcycle. The rough structure feature of an acoustic signal is the voiceprint of the acoustic signal. Since the voice of a person may be a combination of acoustic signals in different frequencies, the voiceprint may be a unique feature for the vocal organs of each person. Since the vocal organs (e.g., vocal cord, nose, and mouth), lips, and the tongue of each person may vary, the voiceprint of each person may be different. There are three primary components of an acoustic signal, such as the tone, sound volume, and frequency of the acoustic signal. For example, the tone is determined by the size and structure of the nose and mouth. Accordingly, rough features such as the age, gender, face type, and height of a speaker can be obtained according to the features of the voiceprint of the speaker.

In an embodiment, the computation apparatus 120 may calculate color histograms of each primary color in the video images captured by each camera 110A to obtain the distribution of colors, and the rough feature of colors can be calculated using the probability-mass function (PMF). The computation apparatus 120 may analyze the acoustic signal captured by each microphone 110B to obtain the acoustic spectrum of the captured acoustic signal, and calculate the distribution of frequencies of the captured acoustic signal. Thus, the rough feature of frequencies can be calculated using the probability-density function (PDF).

The chemical feelings can be classified into tastes and smells, and detection of tastes is performed on liquid chemical components, and detection of smells is performed on a substance in the air. For example, the computation apparatus 120 may obtain distribution information about particles of 7 different smells (e.g., camphoraceous, musky, floral, minty, ethereal, pungent, and putrid smells) according to the sensor data captured by the smell sensors 110D, and calculate rough smell features using the probability mass function. The computation apparatus 120 may also obtain distribution information about six tastes (e.g., sweet, salty, sour, bitter, pungent, and fresh) according to the sensor data captured by the taste sensors 110C, and calculate rough taste features using the probability density function.

The tactile feeling refers to the feeling caused by the skin being mechanically stimulated. The distribution density of the contact point on the skin surface and the area of the sensing region corresponding to the cerebral cortex are positively correlated with the sensitivity to the tactile feeling of the touched part. For example, the computation apparatus 120 may obtain distribution information about three physical properties (e.g., type, strength, and size) according to the sensor data captured by the tactile sensors 110E, and calculate rough tactile features using the probability mass function.

Specifically, in the surveillance system 100, directional remote chemical sensors (e.g., smell sensors 110D), directional contact chemical sensors (e.g., taste sensors 110C), and directional mechanical sensors (e.g., tactile sensors 110E) can be deployed in the scene, and the rough features such as the directions and distances of objects in the scene can be calculated using the positioning techniques described in the above-mentioned embodiment. Then, the space in which the objects are located and the moving vectors of the objects can be roughly defined.

The probability-density function and probability-mass function are functions capable of describing the possibilities of output values of random variables around a certain determined value. Thus, the rough features of objects can be obtained by selecting several output values having the highest probabilities and calculating ratios between the selected probabilities.

In an embodiment, the smell sensors 110D or taste sensors 110C can be installed on a mobile carrier or a mobile electronic police dog in cases where a sniffer dog or a police dog with a keen sense of smell would otherwise be used. For example, a positioning system may also be installed in the mobile carrier or mobile electronic police dog so that it may search back and forth in a domain. Thus, information about detected smells or tastes can be transmitted to a data processing center via wireless transmission, and this information can be used together with other types of feature data.

In another embodiment, assume that there is a child and two adults in a fan-shaped area of a region that is 30 degrees north of east, and the child is one meter from the center of the region, and the two adults are 5 meters from the center of the region. One of the adults is wearing white clothes and the other is wearing black clothes. The adult in white moves slowly northward at a speed of less than 3.0 km/hour (0.83 m/sec), and the adult in black moves quickly westward at a speed of more than 12 km/hour (3.33 m/sec) and screams with amplitude changes at a frequency of 30~150 Hz. The computation apparatus 120 may calculate rough features such as the directions and distances of the three persons using the three-dimensional camera/depth camera, or triangular positioning techniques of directional microphones, thereby roughly defining the space in which the objects are located and the motion vectors of the objects. Then, the computation apparatus 120 may analyze the video images and acoustic signals of the scene to obtain information about the three persons such as color histograms and tones, thereby obtaining the rough features such as roughness and structures of the three persons.

It should be noted that the differences between the rough features and detail features of each type of sensor data may be based on the granularity and precision of samples and values. The rough features can be determined when the data is within a range. With regard to colors, the rough feature of colors can be roughly determined using color histograms. If it is desired to obtain the detail features, various operations such as image-feature matching and calculation are required. As a result, the detail features have a higher precision but require a huge amount of calculating operations. Thus, the detail features can be used to recognize the identity of the object, and the rough features can be used for simple classifications. With regard to texture, the computation apparatus 120 may determine the line pattern and the number of vertical lines and horizontal lines in the image. According to the granularity and precision of the samples and values, a greater amount of data may indicate that the extracted feature has more detail, but it may also indicate that a greater number of calculations and a longer calculation time are required.

With regard to acoustic data, the average human ear is capable of perceiving acoustic signals having a sound volume between 0 and 140 dBs. The "decibel (dB)" is the unit indicating the sound strength or sound volume. 40~50 decibels of sound can disturb sleep, 60~70 decibels of sound can interfere with learning, and 120 decibels of noise and above can cause earache and even permanent hearing loss.

Some examples of sound volumes are provided below, such as the friction sound of rustling leaves being 20 decibels; late-night ambient sound in a residential area in a suburb being 40 decibels; a quiet office being 50 decibels; an average speaking volume being 60 decibels; the sound in a car or the ringing of a phone being 70 decibels; a moving bus being 80 decibels; a dog's bark being 90 decibels; a tram passing over an iron bridge being 100 decibels; the horn of a car, a siren, and music in a karaoke establishment being 110 decibels; a shredder repairing a road being 120 decibels; and the engine sound of a jet taking off being 130 decibels.

The human ear is a very special organ. In order to convert a noise signal measured by the noise-measuring instrument to the noise level perceived by the human ear, frequency domain weighting and calculation should be performed on the acoustic signals in different frequencies measured by the noise-measuring instrument. The human ear can hear sounds in a frequency range of about 20 Hz~20 KHz, and there are different weighting curves for different sound strengths. The most common weighting curves are A-weighting, C-weighting, D-weighting, and G-weighting curves. The C-weighting curve is generally used to measure more noisy mechanical noises, and the D-weighting curve is generally used to measure aeronautical noises, and the G-weighting curve is generally used to measure ultra-low frequency noises that may be structural noises caused by low-frequency vibration.

Timbre indicates different sounds caused by the difference in the harmonic (overtone) composition of the sounding body. Any sound in nature is a complex waveform that has a series of resonant frequencies in addition to the waveform of fundamental frequency, and the series of resonant frequencies are also known as "harmonics", which are whole-number multiples of the fundamental frequency. For example, if the fundamental frequency of vibration of an object is 240 Hz, frequencies such as 480 Hz (the second harmonic) and 720 Hz (the third harmonic) will occur, and the proportion of the components of the harmonic sounds for different objects are also different. The sounds produced by different objects having different proportions of harmonic sounds can be identified as timbres.

Figure 2:
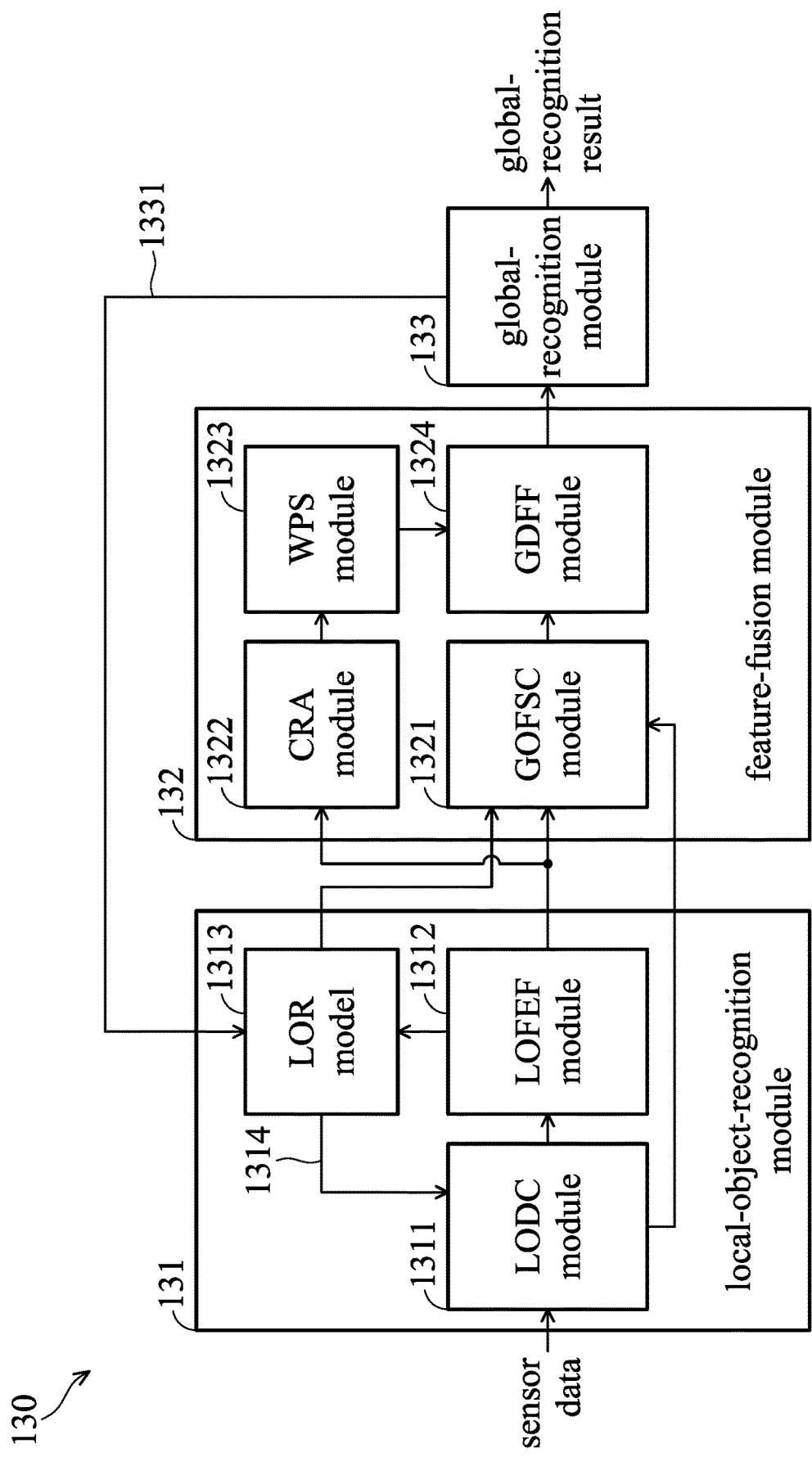
FIG. 2 is a schematic block diagram of a monitoring program 130 in accordance with an embodiment of the disclosure.

FIG. 2 is a schematic block diagram of a monitoring program 130 in accordance with an embodiment of the disclosure. The monitoring program 130, for example, includes a local-object-recognition module 131, a feature-fusion module 132, and a global-recognition module 133. The local-object-recognition module 131 is configured to perform a local-object process on each type of sensor data to generate local-object-feature information for each type.

For example, the local-object-recognition module 131 includes a local-object detection and correspondence module 1311, a local-object feature extraction and fusion module 1312, and a local-object recognition model 1313. The local-object process may include various processes performed by the local-object detection and correspondence module 1311, the local-object feature extraction and fusion module 1312, and the local-object recognition model 1313.

The local-object detection and correspondence module 1311 may receive sensor data from the cameras 110A, microphones 110B, taste sensors 110C, smell sensors 110D, tactile sensors 110E, and perform a local-object detection and correspondence process in each type to generate a local-object ID (LOID) list and a local-rough-feature set (LRFS), and the details are described below.

The local-object feature extraction and fusion module 1312 is configured to perform a local-object-feature extraction and fusion process which includes a local-detail-feature extraction (LDFE) process and a local-detail-feature fusion (LDFF) process. For example, the computation apparatus 120 may extract local-detail features from each type of sensor data and build a corresponding local-detail-feature set (LDFS) according to the LOID list and the LRFS generated by the local-object-recognition module 131. Subsequently, the computation apparatus 120 may fuse the local-detail-feature set corresponding to each type of sensor data into a local-fusion-feature (LFF) of each local object according to the LOID list of each type. In some embodiments, the local-object feature extraction and fusion module 1312 is configured to perform a context-extraction process and a context-fusion process on each type of sensor data to generate a fused-context region.

The local-object recognition model 1313 is configured to perform local-object identity recognition to generate a local-identity-ID (LIID) list corresponding to each type of sensor data. For example, the computation apparatus 120 may input the LFF of each type generated by the local-object feature extraction and fusion module 1312 into the local-object recognition model 1313 to perform a local-object-identity recognition process, label the recognition result with an LIID, and merges each LIID to generate a LIID list. In an embodiment, after the local-object recognition model 1313 has performed the local-object recognition, a local recognition result and a corresponding confidence level of each type can be obtained. The local-object recognition model 1313 may feed the local recognition result of each type and its corresponding confidence level back to the local-object detection and correspondence module 1311 via a feedback path 1314, such that the local-object detection and correspondence module 1311 may perform self-learning according to the local recognition result of each type.

Accordingly, the local-object-feature information generated by the local-object-recognition module 131 includes an LOID list, LRFS, LFF, and LIID list of each type.

The feature-fusion module 132 is configured to perform a global-object process to generate global-object-feature information. For example, the feature-fusion module 132 includes a global-object-and-feature-set correspondence module 1321, a context-region-analysis module 1322, a weighting-coefficient-selection module 1323, and a global-detail-feature fusion module 1324. The global-object process includes various processes performed by the global-object-and-feature-set correspondence module 1321, the context-region-analysis module 1322, the weighting-coefficient-selection module 1323, and the global-detail-feature fusion module 1324.

The global-object-and-feature-set correspondence module 1321 is configured to perform a global-object-correspondence (GOC) process, and a global-detail-feature-correspondence (GDFC) process to generate a global-object ID (GOID) list and a corresponding global-detail-feature set (GDFS). The context-region-analysis module 1322 is configured to perform a local-context analysis on the fused-context region of each type generated by the local-object feature extraction and fusion module 1312, and merges the results of the local-context analysis of each type to generate a local-context-merged result.

The weighting-coefficient-selection module 1323 is configured to determine whether to use an adjacent differential weighting coefficient (ADWC) or an adaptive weighting coefficient (AWC) in the global-detail-feature-fusion (GDFF) process. The global-detail-feature fusion module 1324 is configured to perform the GDFF process according to the weighting coefficient from the weighting-coefficient-selection module 1323. For example, the GDFSs generated by the global-object-and-feature-set correspondence module 1321 are merged into a global-fusion feature (GFF).

Accordingly, the global-object-feature information generated by the feature-fusion module 132 includes the GOID list and its corresponding GDFF, and the GFF.

The global-recognition module 133 is configured to perform global-object recognition on the global-object-feature information generated by the feature-fusion module 132 to generate a global-recognition result. For example, the global-recognition module 133 may input the GFF generated by the global-detail-feature fusion module 1324 into a global-object-recognition model to recognize the global identity of each GFF, and build the GIID list recording the GIID of each GFF. Additionally, the GIID list further records the global-recognition result and its confidence level generated by the global-object-recognition model.

The global-recognition module 133 is further configured to feed the global-recognition result and its confidence level back to the local-object recognition model 1313 via a feedback path 1331. In addition, the global-recognition module 133 may decompose the GFF generated by the global-detail-feature fusion module 1324 to obtain the local-detail feature of each type, and feed the obtained local-detail feature of each type back to the corresponding local-object-recognition model 1313, thereby improving the accuracy of the local-object recognition performed by each local-object-recognition model 1313, where the feedback path 1331 may be regarded as "co-learning".

For purposes of description, a configuration with cameras 110A and microphones 110B is used in the following embodiments, and the sensors in other types can be operated in a similar manner together with the cameras 110A and microphones 110B.

Figure 3A:
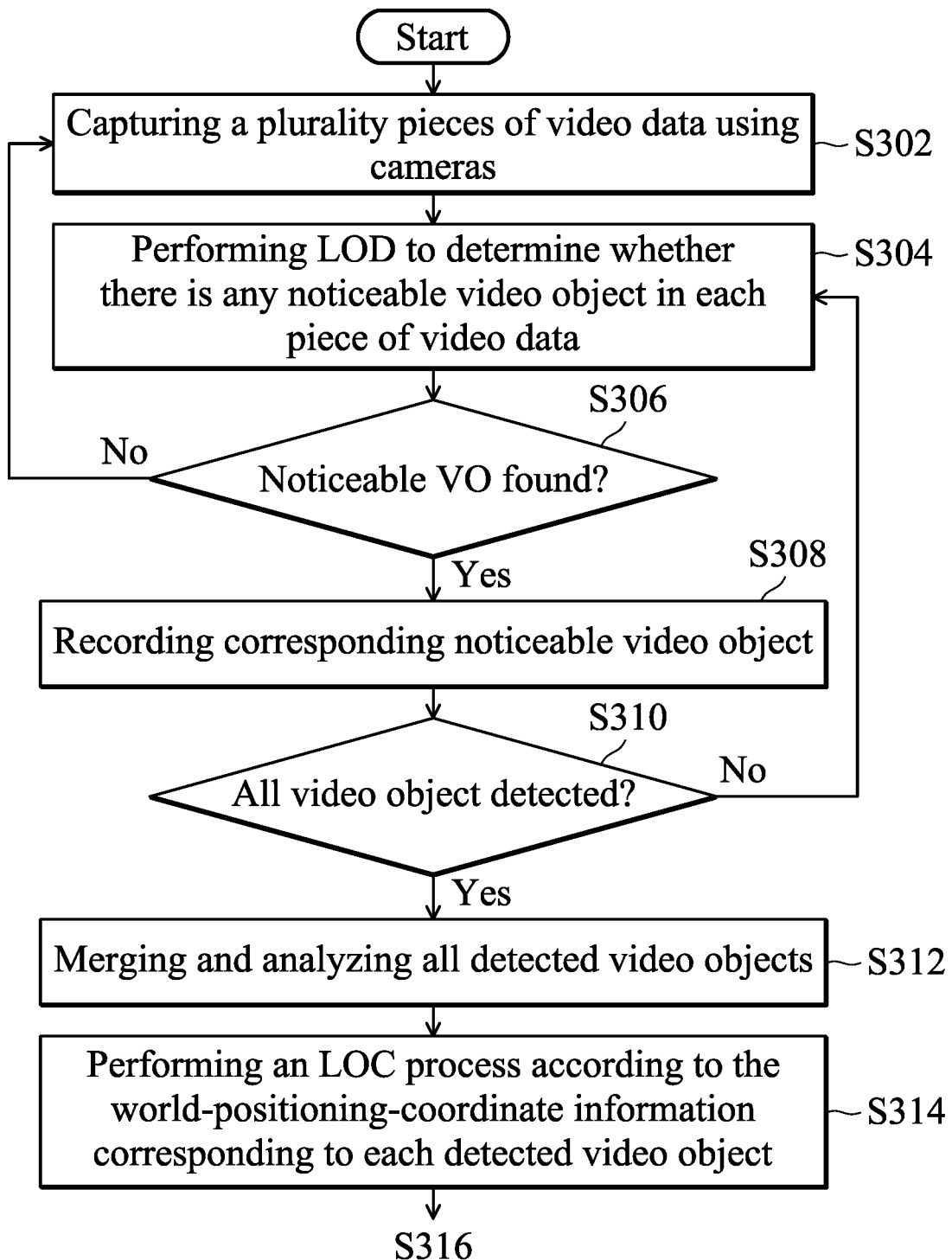
FIGS. 3A-3B are portions of a flow chart of the local-object-correspondence process, local-detail-feature fusion process, and local-object-identity recognition for video objects in accordance with an embodiment of the disclosure.
Figure 3B:
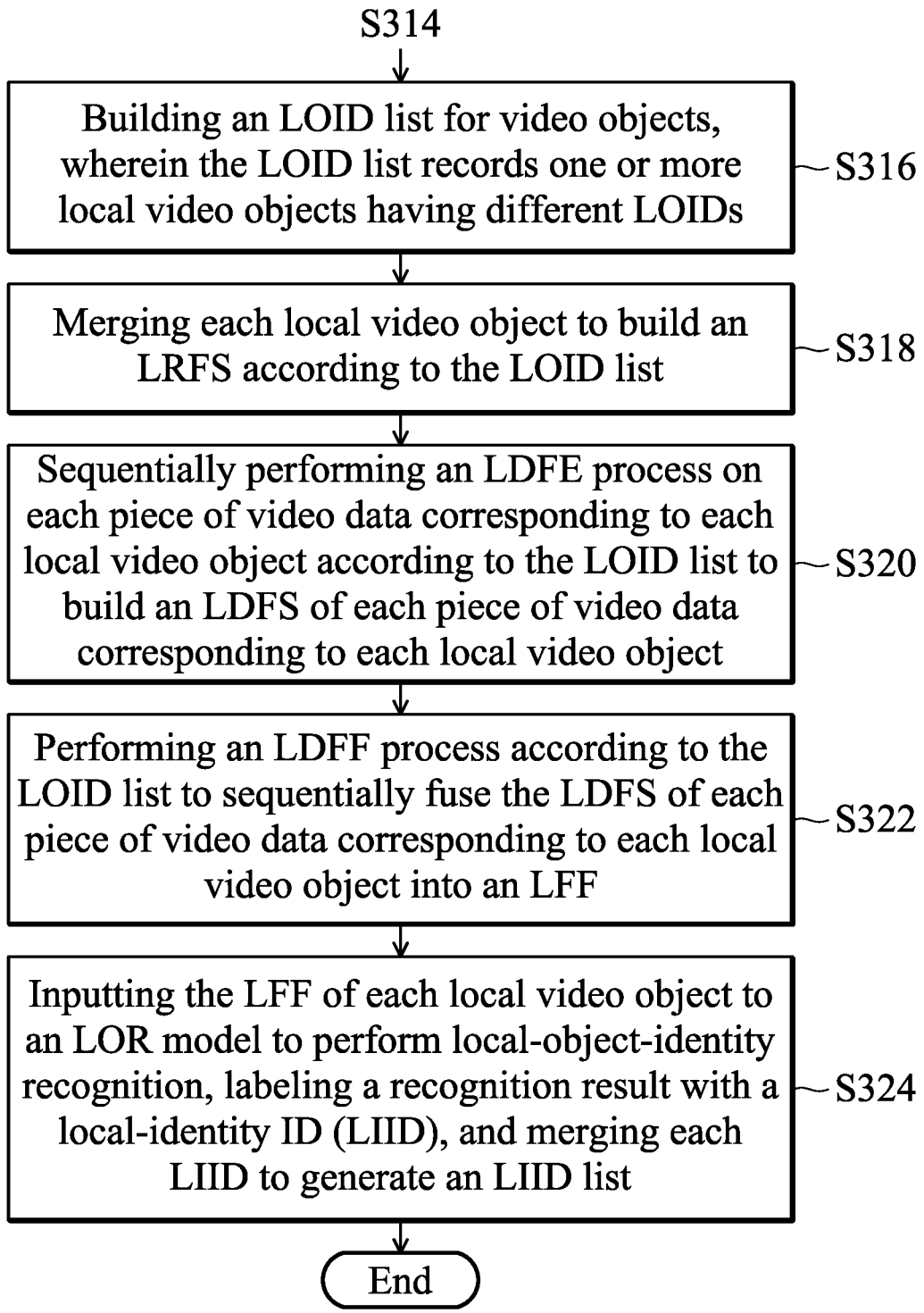

FIGS. 3A-3B are portions of a flow chart of the local-object-correspondence process, local-detail-feature fusion process, and local-object-identity recognition for video objects in accordance with an embodiment of the disclosure.

In step S302, a plurality of cameras 110A are used to capture a plurality of pieces of video data.

In step S304, local-object detection (LOD) is performed to determine whether there is any noticeable video object (VO) in each piece of video data. In step 306, it is determined whether a noticeable video object has been found. If there is a noticeable video object has been found, step S308 is performed to record the corresponding video object. If there is no noticeable video object has been found, step S302 is performed.

For example, the computation apparatus 120 may detect whether there is any noticeable video object in a spatial region within the video frame in each piece of video data. In some embodiments, the computation apparatus 120 may detect particular objects from each piece of video data, such as human, human faces, hands, vehicles, guns, knives, or sticks, but the disclosure is not limited thereto. The computation apparatus 120 may also detect particular behaviors from each piece of video data, such as gathering, chasing, snatching, fighting, or falling, but the disclosure is not limited thereto. That is, the computation apparatus 120 may determine that the above-mentioned particular objects or particular behaviors belong to the noticeable video objects.

In an embodiment, the computation apparatus 120 may detect different particular behaviors from each piece of video data using different determination schemes. Using the gathering behavior as an example, the computation apparatus 120 may determine whether the density of people within a space exceeds a predetermined density for longer than a predetermined time period. For example, the computation apparatus 120 may determine there is a gathering behavior upon detecting that there are from three to five people in each square meter within an area of 5 square meters for 10~30 minutes and these gathered people do not move.

Using the chasing behavior as an example, the computation apparatus 120 may determine the motion trajectory and speed between peoples from the video data captured by the cameras 110A. When the motion trajectories of two people are similar and are kept at a speed over a predetermined speed, the computation apparatus 120 may determine there is a chasing behavior in the video data. Using the falling behavior as an example, the computation apparatus 120 may determine whether four limbs of a person has an angular speed higher than a predetermined angular speed upon falling and has paused for a predetermined time period. In addition, the surveillance system 100 may also obtain the sensor data detected by the wearable device being worn on the user, thereby determining whether there is a falling behavior in the video data. Using snatching or fighting behaviors as an example, the computation apparatus 120 may use a well-known behavior determination algorithm to analyze whether there is a snatching or fighting behavior in the video data.

Specifically, in the arts of artificial intelligence (AI) and computer vision (CV), behavior detection is a very high-end application. In addition to object recognition, information such as dynamic time ordering, motion trajectories of objects, interactions between objects, distributions of objects, and density of objects can be used. In the present disclosure, sensors of different types can be incorporated to achieve complementary and global object recognition. Besides, video data belongs to the different types of sensor data used by the surveillance system 100 of the present disclosure. It should be noted that the present disclosure is not limited to the techniques for behavior detection using video data described in the aforementioned embodiments.

Additionally, the computation apparatus 120 may calculate the world-positioning-coordinate information of each detected video object. For example, the computation apparatus 120 may obtain information such as the installation position, shooting angle, field of view of each camera 110A, and the world-positioning-coordinate information of each video object in the video data captured by each camera 110A. While each camera 110A is capturing video images of a scene, each camera 110A may add corresponding time stamps into the captured video images, thereby facilitating the subsequent local-object-correspondence (LOC) process and global-object-correspondence (GOC) process.

In step S310, it is determined whether all video objects in each piece of video data have been detected. If all video objects have been detected, step S312 is performed. If all video objects haven't been detected, step S304 is performed.

In step S312, all detected video objects are merged and analyzed. For example, one or more video objects may be detected from each piece of video data, and each video object may have its own world-positioning-coordinate information and time stamps. Accordingly, the computation apparatus 120 may determine whether the video objects in different video data are correlated according to the world-positioning-coordinate information and time stamps of each video object.

In step S314, an LOC process is performed according to the world-positioning-coordinate information (and/or time stamps) corresponding to each detected video object, thereby corresponding and linking video objects associated with the same local video object, and labeling an LOID on the video objects associated with the same local video object. Using the local video object as an example, its local object ID can be regarded as a local video object ID (LVOID).

In step S316, an LOID list (e.g., first LOID list) for video objects is built, wherein the LOID list records one or more local video objects having different LOIDs.

In step S318, each local video object is merged to build an LRFS according to the LOID list, wherein the LRFS includes information about the direction, distance, roughness, and structure of each local video object.

In step S320, a local-detail-feature-extraction (LDFE) process is sequentially performed on each piece of video data corresponding to each local video object according to the LOID list to build an LDFS of each piece of video data corresponding to each local video object.

In step S322, an LDFF process is performed according to the LOID list to sequentially fuse the LDFS of each piece of video data corresponding to each local video object into an LFF.

In step S324, the LFF of each local video object is input to a local-object-recognition (LOR) model to perform local-object-identity recognition, and a recognition result is labeled with a local-identity ID (LIID), and each LIID are merged to generate an LIID list L1. Each LIID generated in the flow of FIGS. 3A-3B is used to label a corresponding local video object in the video data, and thus each LIID can be regarded as local-video-identity ID (LVIID). In addition, the LIID list L1 can be regarded as a local-video-identity ID list.

Figure 4A:
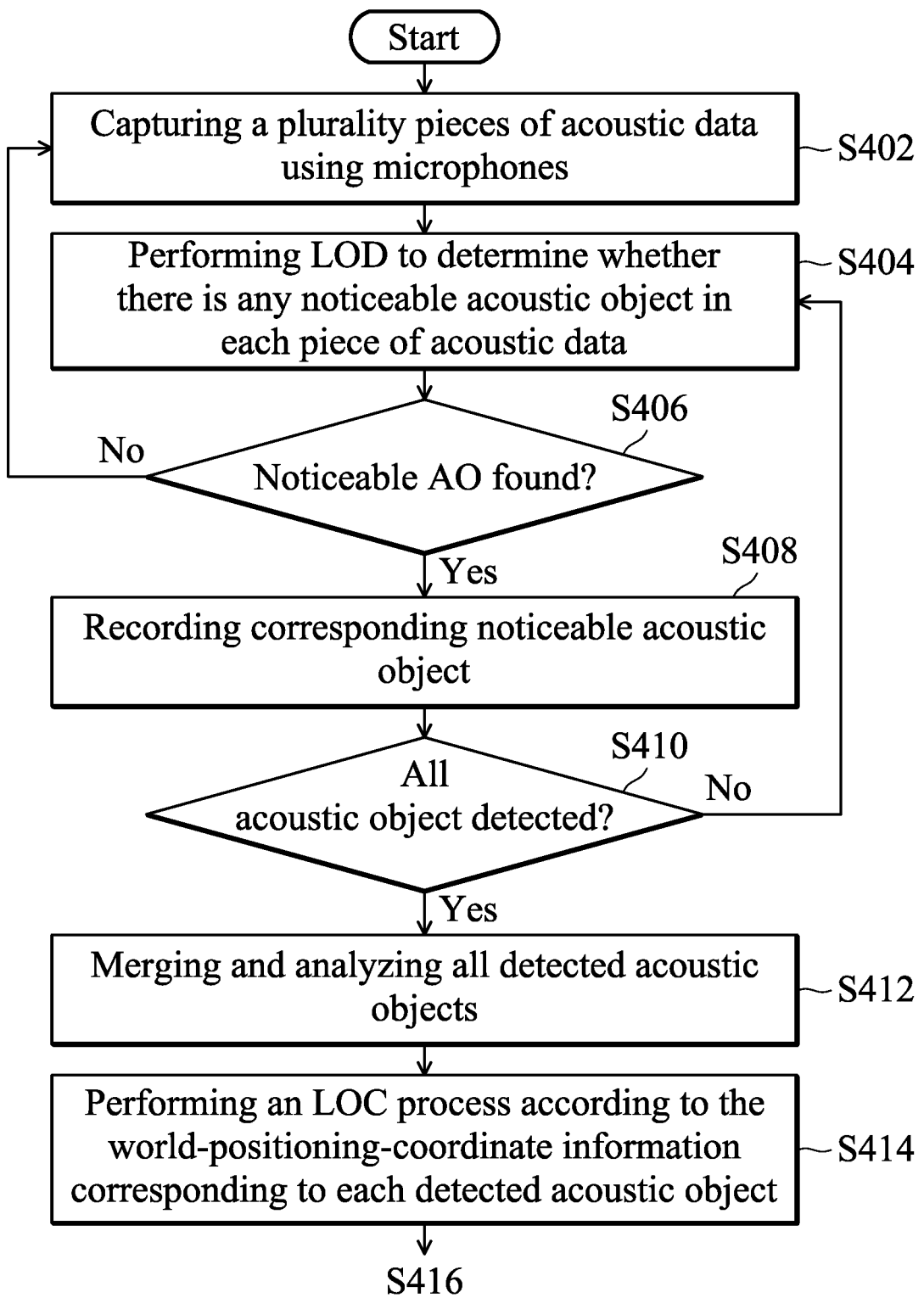
FIGS. 4A-4B are portions of a flow chart of the local-object-correspondence process, local-detail-feature fusion process, and local-object-identity recognition for acoustic objects in accordance with an embodiment of the disclosure.
Figure 4B:
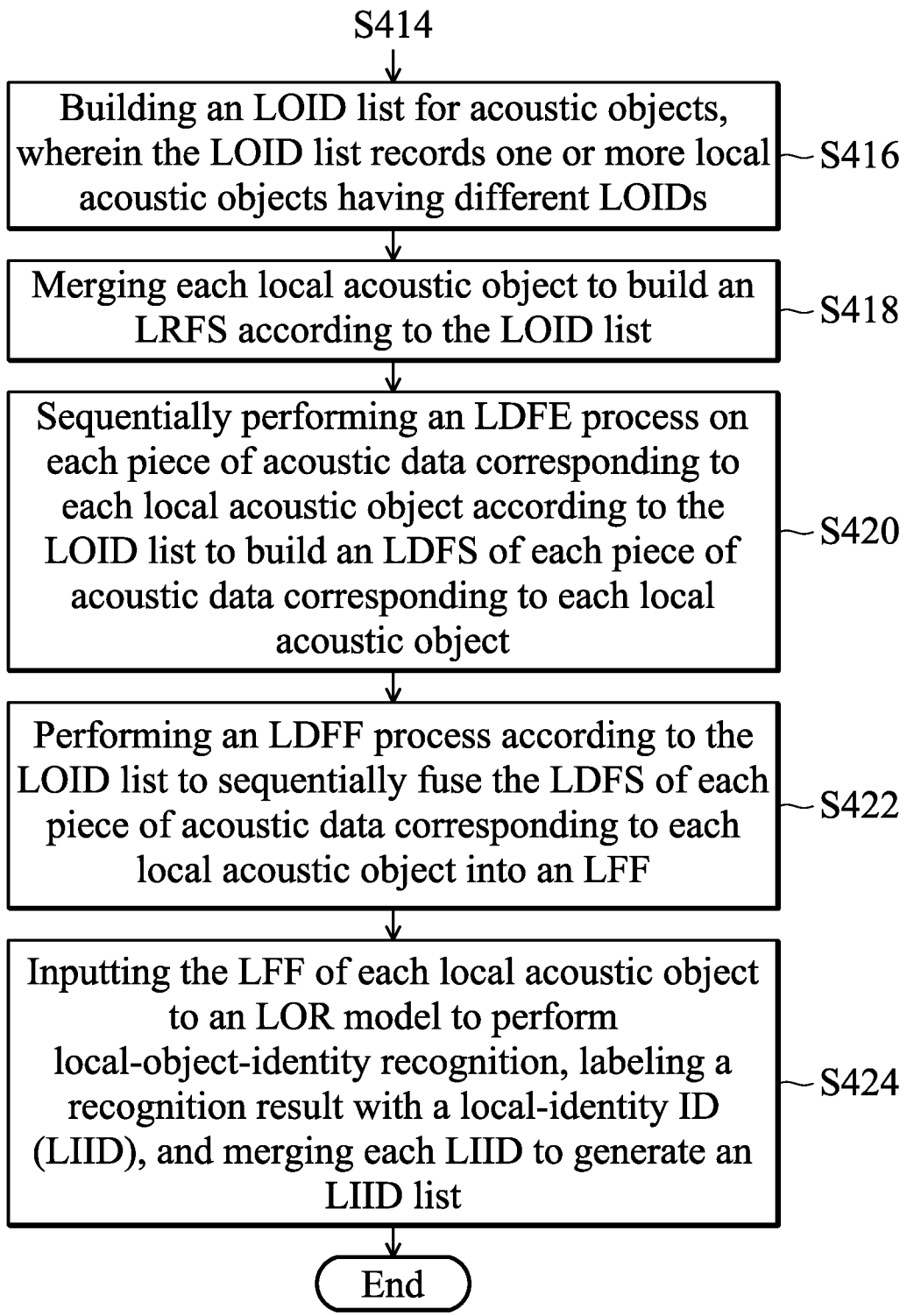

FIGS. 4A-4B are portions of a flow chart of the local-object-correspondence process, local-detail-feature fusion process, and local-object-identity recognition for acoustic objects in accordance with an embodiment of the disclosure.

In step S402, a plurality of cameras 110A are used to capture a plurality of pieces of acoustic data.

In step S404, local-object detection (LOD) is performed to determine whether there is any noticeable acoustic object (AO) in each piece of acoustic data. In step 406, it is determined whether a noticeable acoustic object has been found. If there is a noticeable acoustic object has been found, step S408 is performed to record the corresponding acoustic object. If there is no noticeable acoustic object has been found, step S402 is performed.

For example, the computation apparatus 120 may detect whether there is any noticeable acoustic object in a temporal exploration region within an acoustic segment in each piece of acoustic data. In some embodiments, the computation apparatus 120 may detect particular object sounds or event sounds from each piece of acoustic data, such as sounds of gunshots, explosions, crying, noises, or percussion, but the disclosure is not limited thereto. That is, the computation apparatus 120 may determine that the above-mentioned aforementioned particular object sounds or event sounds are unusual sounds in the environment, and thus these sounds belong to the noticeable acoustic objects. For example, conventional speech-signal processing techniques such as "Mel-frequency cepstrum coefficient (MFCC)" method, or "linear prediction cepstrum coefficient (LPCC)" method can be used to perform feature extraction on the aforementioned unusual sounds.

However, there are many other types of sounds in the real world, such as vehicle whistle, footsteps, and other low-frequency atmospheric noises, and the conventional speech-signal processing techniques cannot deal with the aforementioned types of sounds. In an embodiment, the computation apparatus 120 may convert the acoustic signal captured by each microphone 110B into a sound spectrum of unusual sounds, and perform feature description on the time-frequency feature of the sound spectrum using a 2D-Gabor filter. Then, the computation apparatus 120 may extract the features of the sound spectrum of unusual sounds using the "stochastic non-negative independent component analysis (SNICA)" method, and perform classification identification using "sparse representation classification (SRC)" method, thereby determining other types of unusual sounds in the real world.

Additionally, the computation apparatus 120 may calculate the world-positioning-coordinate information of each detected acoustic object. For example, the computation apparatus 120 may obtain information such as the installation position, perceiving angle, gap distance of each microphone 110B, and the world-positioning-coordinate information of each acoustic object in the acoustic data captured by each microphone 110B. While each microphone 110B is capturing acoustic data of a scene, each microphone 110B may add corresponding time stamps into the captured acoustic data, thereby facilitating the subsequent local-object-correspondence (LOC) process and global-object-correspondence (GOC) process.

In step S410, it is determined whether all acoustic objects in each piece of acoustic data have been detected. If all acoustic objects have been detected, step S412 is performed. If all acoustic objects haven't been detected, step S404 is performed.

In step S412, all detected acoustic objects are merged and analyzed. For example, one or more acoustic objects may be detected from each piece of acoustic data, and each acoustic object may have its own world-positioning-coordinate information and time stamps. Accordingly, the computation apparatus 120 may determine whether the acoustic objects in different acoustic data are correlated according to the world-positioning-coordinate information and time stamps of each acoustic object.

In step S414, a LOC process is performed according to the world-positioning-coordinate information (and/or time stamps) corresponding to each detected acoustic object, thereby corresponding and linking acoustic objects associated with the same local acoustic object, and labeling an LOID on the acoustic objects associated with the same local acoustic object. Using the local acoustic object as an example, its local object ID can be regarded as a local acoustic object ID (LAOID).

In step S416, an LOID list (e.g., second LOID list) for local acoustic objects is built, wherein the LOID list records one or more local acoustic objects having different LOIDs.

In step S418, each local acoustic object is merged to build an LRFS according to the LOID list, wherein the LRFS includes information about the direction, distance, roughness, and structure of each local video object.

In step S420, a local-object-detail-feature extraction process is sequentially performed on each piece of acoustic data corresponding to each local acoustic object according to the LOID list to build an LDFS of each piece of acoustic data corresponding to each local acoustic object.

In step S422, an LDFF process is performed according to the LOID list to sequentially fuse the LDFS of each piece of acoustic data corresponding to each local acoustic object into an LFF.

In step S424, the LFF of each local acoustic object is input to a local-object-recognition (LOR) model to perform local-object-identity recognition, and a recognition result is labeled by a local-identity ID (LIID), and each LIID are merged to generate an LIID list L2. Each LIID generated in the flow of FIG. 4 is used to label a corresponding local acoustic object in the acoustic data, and thus each LIID can be regarded as local-acoustic-identity ID (LAIID) In addition, the LIID list L2 can be regarded as a local-acoustic-identity ID list.

Figure 5:
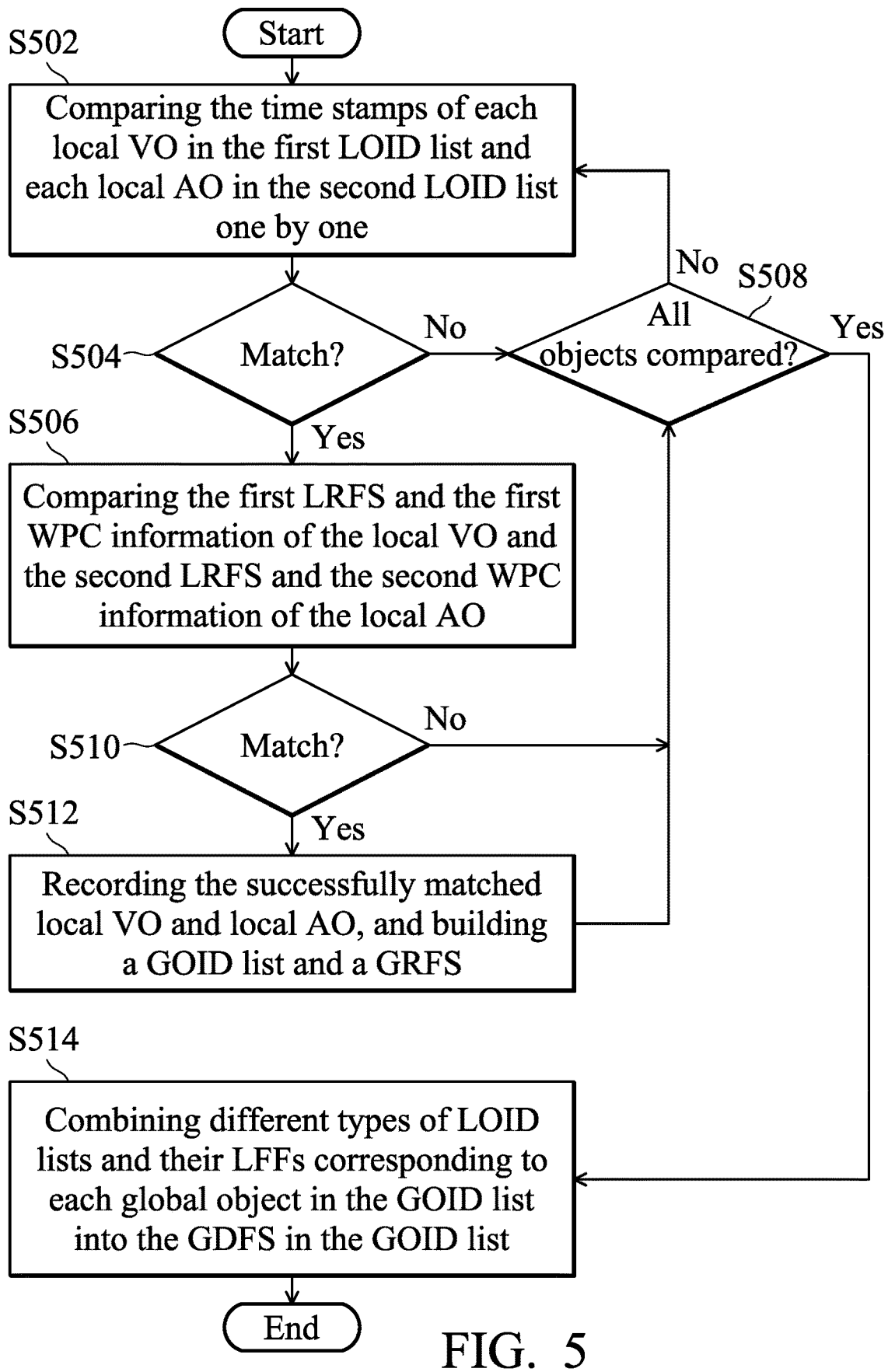
FIG. 5 is a flow chart of the global-object-correspondence (GOC) process and building the global-detail-feature set (GDFS) in accordance with an embodiment of the disclosure.

FIG. 5 is a flow chart of the global-object-correspondence (GOC) process and building the global-detail-feature set (GDFS) in accordance with an embodiment of the disclosure. In an embodiment, the information and LOID lists generated by various processes with regard to video objects and acoustic objects in FIGS. 3A-3B and FIG. 4 are used in the flow of the GOC process and building the GDFS in FIG. 5.

In step S502, the time stamps of each local video object in the first LOID list and each local acoustic object in the second LOID list are compared one by one.

In step S504, it is determined whether the time stamps of the compared local video object and local acoustic object match. If the time stamps match, step S506 is performed. If the time stamps do not match, step S508 is performed.

In step S506, the first LRFS and the first world-positioning-coordinate (WPC) information of the local video object and the second LRFS and the second world-positioning-coordinate information of the local acoustic object are compared.

In step S508, it is determined whether each local video object in the first LOID list and each local acoustic object in the second LOID list have been compared. If so, step S514 is performed; if not, step S502 is performed.

In step S510, it is determined whether the first LRFS matches the second LRFS and whether the first world-positioning-coordinate information matches the second world-positioning-coordinate information. If the first LRFS matches the second LRFS and the first world-positioning-coordinate information matches the second world-positioning-coordinate information, step S512 is performed. If the first LRFS does not match the second LRFS or the first world-positioning-coordinate information does not match the second world-positioning-coordinate information, step S508 is performed. For example, if the determination result in step S510 is "yes", it indicates that the time stamps of the selected local video object in the first LOID list and the selected local acoustic object in the second LOID list matches each other, and the first LRFS matches the second LRFS and the first world-positioning-coordinate information matches the second world-positioning-coordinate information. Accordingly, the computation apparatus 120 may determine that the selected local video object and the selected local acoustic object are associated with the same object.

In step S512, the successfully matched local video object and local acoustic object are recorded, and a GOID list and a global-rough-feature set (GRFS) are built. For example, the successfully matched local video object and local acoustic object may be linked to each other and can be regarded as a global object, and the computation apparatus 120 may assign a global-object ID (GOID) to the global object. Accordingly, the computation apparatus 120 may record each global object and its corresponding GOID in the GOID list. Additionally, each of the successfully matched local video object and local acoustic object has its own corresponding LRFS, and the computation apparatus 120 may link the LRFS of the local video object and the LRFS of the local acoustic object to each other to form the GRFS of the global object.

In step S514, different types of LOID lists and their LFFs corresponding to each global object in the GOID list are combined into the GDFS in the GOID list. For example, the GOID list includes successfully matched local video objects and local acoustic objects, and each of the successfully matched local video objects and local acoustic objects has its own corresponding LFF, and thus the computation apparatus 120 may link the LFF of the local video object and the LFF of the local acoustic object to each other to generate a GDFS that corresponds to the global object.

Figure 6A:
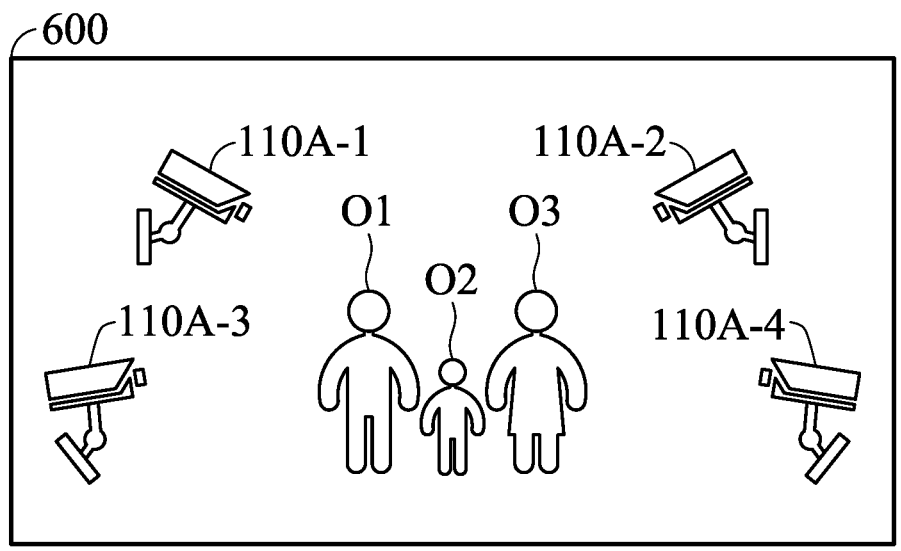
FIG. 6A is a diagram of capturing video data of a scene using a plurality of cameras in accordance with an embodiment of the disclosure.

FIG. 6A is a diagram of capturing video data of a scene using a plurality of cameras in accordance with an embodiment of the disclosure.

For example, if 4 cameras 110A of the surveillance system 100 are installed in the scene 600 to capture video data of the scene 600. There are three objects in the scene 600, such as person 1 (i.e., object O1), person 2 (i.e., object O2), and person 3 (i.e., object O3), and persons 1, 2, 3 are respectively a male adult, a male child, and a female adult, as shown in FIG. 6A. The four cameras 110A may include cameras 110A-1, 110A-2, 110A-3, and 110A-4 that are installed at different positions. In this scenario, each of objects O1, O2, and O3 may be captured by a portion of the cameras 110A due to the objects being covered or bad shooting angles. For example, object O1 is captured by cameras 110A-1, 110A-2 and 110A-3, and object O2 is captured by cameras 110A-1 and 110A-2, and object O3 is captured by cameras 110A-1, 110A-2, and 110A-4. The computation apparatus 120 may perform object detection on the video data captured by each of the cameras 110A, and video objects VO1, VO2, and VO3 are detected. The computation apparatus 120 may assign a corresponding object ID to each of the video objects VO1, VO2, and VO3. For example, the object IDs of the video objects VO1, VO2, and VO3 are VOID1, VOID2, and VOID3, respectively. In addition, the object IDs VOID1~VOID3 corresponding to the video objects VO1~VO3 can be regarded as local object IDs (LOIDs) of the video data.

With regard to object O1, since object O1 is captured by the cameras 110A-1, 110A-2, and 110A-3, the computation apparatus 120 may perform the local-detail-feature-extraction process on the video data captured by the cameras 110A-1, 110A-2, and 110A-3 to obtain the local-video-detail features of video objects (e.g., colors, textures, and shapes of objects). Thus, the local-video-detail features VidF1_O1, VidF2_O1, and VidF3_O1 associated with object O1 can be obtained. Then, the computation apparatus 120 may perform the local-detail-feature fusion process on the local-video-detail features VidF1_O1, VidF2_O1, and VidF3_O1 to obtain a fused-video-detail feature VidFF_O1 associated with object O1. Briefly, the fused-video-detail feature VidFF_O1 may indicate different video features of the same object O1 captured by the cameras 110A at different shooting angles.

Similarly, with regard to object O2, since object O2 is captured by the cameras 110A-1 and 110A-2, the computation apparatus 120 may perform the local-detail-feature extraction process on the video data captured by the cameras 110A-1 and 110A-2 to obtain the local-video-detail features of video objects (e.g., colors, textures, and shapes of objects). Thus, the local-video-detail features VidF1_O2 and VidF2_O2 associated with object O2 can be obtained. Then, the computation apparatus 120 may perform the local-detail-feature fusion process on the local-video-detail features VidF1_O2 and VidF2_O2 to obtain a fused-video-detail feature VidFF_O2 associated with object O2. The fused-video-detail feature VidFF_O2 may indicate different video features of the same object O2 captured by the cameras 110A at different shooting angles.

Similarly, with regard to object O3, since object O3 is captured by the cameras 110A-1, 110A-2, and 110A-4, the computation apparatus 120 may perform the local-detail-feature extraction process on the video data captured by the cameras 110A-1, 110A-2, and 110A-4 to obtain the local-video-detail features of video objects (e.g., colors, textures, and shapes of objects). Thus, the local-video-detail features VidF1_O3, VidF2_O3, and VidF4_O3 associated with object O3 can be obtained. Then, the computation apparatus 120 may perform the local-detail-feature fusion process on the local-video-detail features VidF1_O3, VidF2_O3, and VidF4_O3 to obtain a fused-video-detail feature VidFF_O3 associated with object O3. The fused-video-detail feature VidFF_O3 may indicate different video features of the same object O3 captured by the cameras 110A at different shooting angles.

It should be noted that while the cameras 110A-1, 110A-2, 110A-3, and 110A-4 are capturing video images of the scene, corresponding time stamps are also added into the captured video images, and the fused-video-detail features VidFF_O1, VidFF_O2, and VidFF_O3 may also have corresponding time stamps. For example, the first LOID list includes the fused-video-detail features VidFF_O1, VidFF_O2, VidFF_O3, and their corresponding time stamps.

The computation apparatus 120 may input the fused-video-detail features VidFF_O1, VidFF_O2, and VidFF_O3 into a local-video-object-recognition model to recognize the identity of each of the fused-video-detail features VidFF_O1, VidFF_O2, and VidFF_O3. For example, the computation apparatus 120 may assign a local-video-identity identifier (LVIID) such as LVIID1, LVIID2, and LVIID3 to each of the fused-video-detail features VidFF_O1, VidFF_O2, and VidFF_O3, respectively. In addition, the computation apparatus 120 may record the local-video-identity identifiers LVIID1, LVIID2, and LVIID3 into an LIID list (e.g., LIID list L1).

Figure 6B:
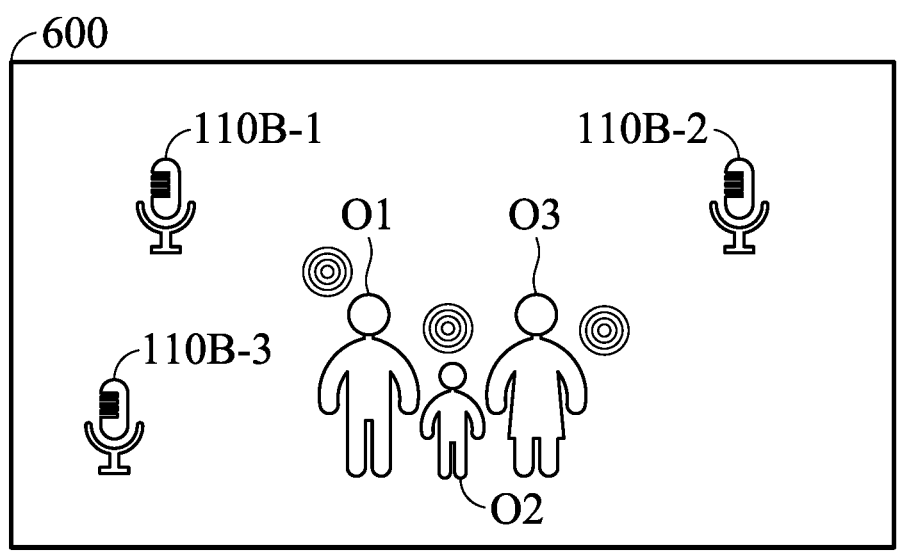
FIG. 6B is a diagram of capturing acoustic data of a scene using a plurality of microphones in accordance with an embodiment of the disclosure.

FIG. 6B is a diagram of capturing acoustic data of a scene using a plurality of microphones in accordance with an embodiment of the disclosure.

Three microphones 110B of the surveillance system 100 are installed in the scene 600 to capture acoustic data of the scene 600. The three microphones cameras 110B may include microphones 110B-1, 110B-2, and 110B-3 that are installed at different positions. The microphones 110B-1, 110B-2, and 110B-3 may be attached on the cameras 110A-1, 110A-2, and 110A-3 in FIG. 6A to capture acoustic data, respectively. Alternatively, microphones 110B-1, 110B-2, and 110B-3 may also be installed at different positions in the scene 600 to capture acoustic data.

In this scenario, each of objects O1, O2, and O3 may be captured by a portion of the microphones 110B due to the objects being covered, sound volumes, or distances. For example, object O1 is captured by microphones 110B-2 and 110A-3, and object O2 is captured by microphones 110B-1 and 110B-3, and object O3 is captured by microphone 110B-3.

With regard to object O1, since object O1 is captured by the microphones 110B-2 and 110B-3, the computation apparatus 120 may perform the local-detail-feature extraction process on the acoustic data captured by the microphones 110B-2 and 110B-3 to obtain the local-acoustic-detail features of acoustic objects (e.g., sound volume, pitch, and tone of acoustic objects). Thus, the local-acoustic-detail features AudF2_O1 and AudF3_O1 associated with object O1 can be obtained. Then, the computation apparatus 120 may perform the local-detail-feature fusion process on the local-acoustic-detail features AudF2_O1 and AudF3_O1 to obtain a fused-acoustic-detail feature AudFF_O1 associated with object O1. Briefly, the fused-acoustic-detail feature AudFF_O1 may indicate different acoustic features of the same object O1 captured by the microphones 110B at different positions.

Similarly, with regard to object O2, since object O2 is captured by the microphones 110B-1 and 110B-3, the computation apparatus 120 may perform the local-detail-feature extraction process on the acoustic data captured by the microphones 110B-1 and 110B-3 to obtain the local-acoustic-detail features of acoustic objects (e.g., sound volume, pitch, and tone of acoustic objects). Thus, the local-acoustic-detail features AudF1_O2 and AudF3_O2 associated with object O2 can be obtained. Then, the computation apparatus 120 may perform the local-detail-feature fusion process on the local-acoustic-detail features AudF1_O2 and AudF3_O2 to obtain a fused-acoustic-detail feature AudFF_O2 associated with object O2. The fused-acoustic-detail feature AudFF_O2 may indicate different acoustic features of the same object O2 captured by the microphones 110B at different positions.

Similarly, with regard to object O3, since object O3 is captured by the microphone 110B-3, the computation apparatus 120 may perform the local-detail-feature extraction process on the acoustic data captured by the microphone 110B-3 to obtain the local-acoustic-detail features of acoustic objects (e.g., sound volume, pitch, and tone of acoustic objects). Thus, the local-acoustic-detail feature AudF3_O3 associated with object O3 can be obtained. Then, the computation apparatus 120 may perform the local-detail-feature fusion process on the local-acoustic-detail features AudF3_O3 to obtain a fused-acoustic-detail feature AudFF_O3 associated with object O3. The fused-acoustic-detail feature AudFF_O3 may indicate different acoustic features of the same object O3 captured by the microphones 110B at different positions.

It should be noted that while the microphones 110B-1, 110B-2, and 110B-3 are capturing acoustic data of the scene 600, corresponding time stamps are also added into the captured acoustic data, and the fused-acoustic-detail features AudFF_O1, AudFF_O2, and AudFF_O3 includes corresponding time stamps. That is, the second LOID list includes the fused-acoustic-detail features AudFF_O1, AudFF_O2, AudFF_O3, and corresponding time stamps.

The computation apparatus 120 may input the fused-acoustic-detail features AudFF_O1, AudFF_O2, and AudFF_O3 into a local-acoustic-object-recognition model to recognize the identity of each of the fused-acoustic-detail features AudFF_O1, AudFF_O2, and AudFF_O3. For example, the computation apparatus 120 may assign a local-acoustic-identity identifier (LAIID) such as LAIID1, LAIID2, and LAIID3 to each of the fused-acoustic-detail features AudFF_O1, AudFF_O2, and AudFF_O3, respectively. In addition, the computation apparatus 120 may record the local-acoustic-identity identifiers LAIID1, LAIID2, and LAIID3 into an LIID list (e.g., LIID list L2).

Figure 7A:
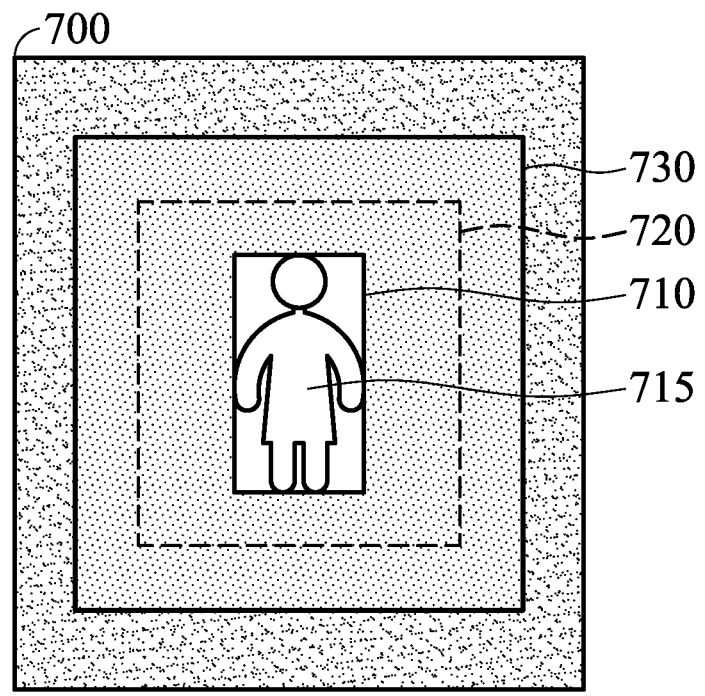
FIG. 7A is a diagram of different spatial divisions within a video frame in accordance with an embodiment of the disclosure.

FIG. 7A is a diagram of different spatial divisions within a video frame in accordance with an embodiment of the disclosure.

As depicted in FIG. 7A, there are various spatial divisions within each video frame to facilitate image detection, image recognition, and image analysis performed by the computation apparatus 120. For example, the video frame 700 includes various regions such as a region of interest (ROI) 710, an exploration region 720, and a context region 730. The ROI 710 indicates the spatial range of the video object 715 within the video frame 700. The exploration region 720 indicates the region around the ROI 710 belonging to the video object 715, and is used for tracking the video object 715 in the computer vision. The context region 730 is larger than the exploration region 720, and indicates the spatial range used for performing the context analysis of the video object 715.

Figure 7B:
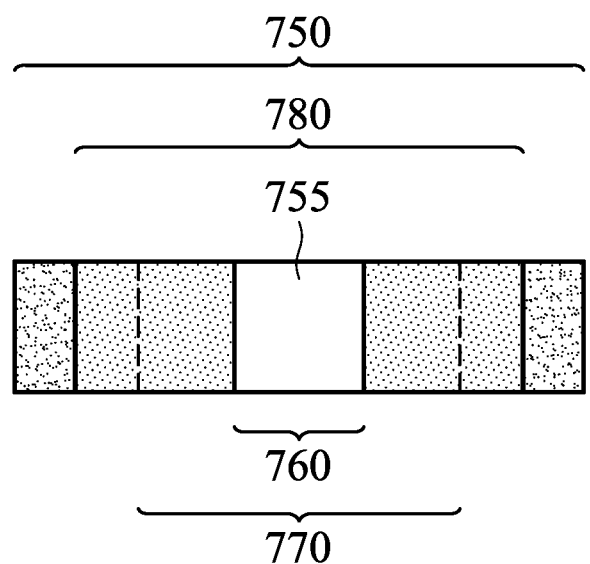
FIG. 7B is a diagram of different temporal divisions within an acoustic segment in accordance with an embodiment of the disclosure.

FIG. 7B is a diagram of different temporal divisions within an acoustic segment in accordance with an embodiment of the disclosure.

As depicted in FIG. 7B, there are different temporal divisions within each acoustic segment to facilitate acoustic detection, acoustic recognition, and acoustic analysis performed by the computation apparatus 120. For example, the acoustic segment 750 may include different regions such as a region of interest (ROI) 760, an exploration region 770, and a context region 780. The ROI 760 indicates the temporal range of the acoustic object 755 within the acoustic segment 750. The exploration region 770 indicates the range of time points close to the ROI 760, and is used for tracking the acoustic object 755 by the computation apparatus 120. The context region 780 is larger than the exploration region 770, and indicates the temporal range used for performing the context analysis of the acoustic object 755.

Referring to the embodiments of FIG. 7A and FIG. 7B, it can be understood that the ROI region may be a spatial region or a temporal region in which the object is located. When the computation apparatus 120 is tracking the object, an exploration region (e.g., exploration regions 720 and 770) spatially or temporally larger than the ROI (e.g., ROIs 710 and 760) is used. In addition, when the computation apparatus 120 is performing the context analysis, the computation apparatus 120 may use a context region spatially or temporally larger than the exploration region (e.g., exploration regions 720 and 770), such as the context region 730 in FIG. 7A and the context region 780 in FIG. 7B.

Specifically, the context region defines the boundaries of the largest exploration region, and the ROI is the smallest exploration region. When the computation apparatus 120 is performing object tracking, a predicted ROI is defined by the user or the computation apparatus 120, and the recognition model (e.g., local-object-recognition model) may search for the object in the exploration region. In an embodiment, the computation apparatus 120 may set the range of the exploration region to be twice the area of the ROI, but the disclosure is not limited thereto. In another embodiment, the computation apparatus 120 may automatically adjust the size of the exploration region according to the motion speed and direction of the object. However, the computation apparatus 120 usually does not set an oversized exploration region in consideration of performance and efficiency, and the size of the exploration region can be limited by manually setting the context region.

In an embodiment, before the computation apparatus 120 performs the global-detail-feature fusion process, the computation apparatus 120 may first perform the context analysis (e.g., by the context-region-analysis module 1322) to calculate the distribution of weighting coefficients of each feature. If the computation apparatus 120, according to the results of the context analysis, determines that the distribution of weighting coefficients of the LFF of each type is biased toward some LFFs (i.e., can be regarded as the LFFs having great differences), it may result in a biased result of the global-object recognition. In this situation, the adaptive weighting coefficients (AWC) should be used for calculations of weighted features. Conversely, if the computation apparatus 120, according to the results of the context analysis, determines that the distribution of weighting coefficients of the LFF of each type has little differences, the weighting coefficient of the local features in each type can be regarded as the adjacent differential weighting coefficient (ADWC). If the computation apparatus 120 performs the context analysis on the predicted ROI, the range used by the computation apparatus 120 in the calculation for the differences between the feature values in different types is regarded as a predicted ROI, and the predicted ROI can also be regarded as an interested-context region. In addition, the range of the ROI in which the object is located can be confirmed and regarded as a recognized ROI after searching and recognition by the recognition model in the exploration region have been completed.

Figure 8A:
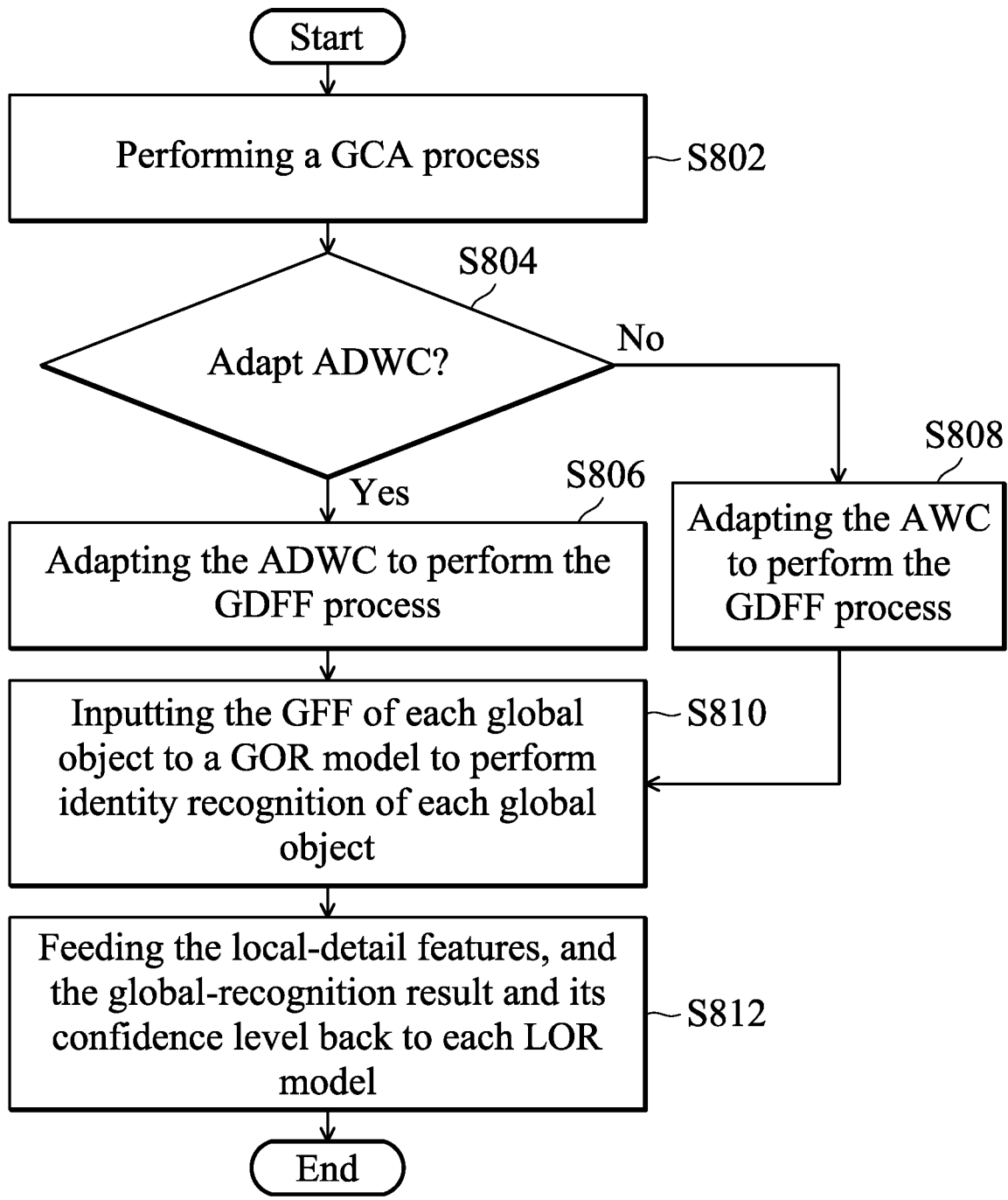
FIG. 8A is a flow chart of selecting coefficients of global-detail-feature fusion according to the context analysis in accordance with an embodiment of the disclosure.

FIG. 8A is a flow chart of selecting coefficients of global-detail-feature fusion according to the context analysis in accordance with an embodiment of the disclosure.

In step S802, a global-context-analysis (GCA) process is performed. For example, the GCA process may analyze a context region corresponding to each of the video objects and acoustic objects.

In step S804, it is determined whether it is appropriate to adapt the ADWC. For example, step S804 can be regarded as a weighting-coefficient determination step. If it is determined that it is appropriate to adapt the ADWC (e.g., little differences between the local-fusion features), step S806 is performed, and the ADWC is used to perform the global-detail-feature fusion process. If it is determined that it is not appropriate to adapt the ADWC (e.g., large differences between the local-fusion features), step S808 is performed, and the adaptive-weighting coefficient (AWC) is used to perform the global-detail-feature fusion process.

For example, in step S806, the computation apparatus 120 adapts the ADWC to perform the global-detail-feature fusion process. For example, the computation apparatus 120 may update the ADWC, and use the updated ADWC to perform the global-detail-feature fusion process, thereby fusing the GDFS of each object in each type in the GOID list using the updated ADWC to generate a global-fusion feature.

In step S808, the computation apparatus 120 adapts the AWC to perform the global-detail-feature fusion process. When the computation apparatus 120, according to the results of the context analysis, determines that it is not appropriate to use the ADWC (e.g., obvious local features), the computation apparatus 120 may use the AWC via a feedback path to perform the global-detail-feature fusion process, thereby fusing the GFF of each object in each type of each global object in the GOID list using the AWC to generate a global-fusion feature.

In step S810, the global-fusion feature of each global object is input to a global-object-recognition (GOR) model to perform identity recognition of each global object, thereby generating a global-identity-ID (GIID) list. For example, the computation apparatus 120 may record the GIID in the GIID list. In addition, the GIID list further records the global-recognition result and its confidence level.

In step S812, the local-detail features, and the global-recognition result and its confidence level are fed back to each local-object-recognition model. For example, in addition to being input to the global-object-recognition model, the global-fusion feature is further decomposed into original local-detail features that are fed back to a corresponding local-object-recognition model.

Figure 8B:
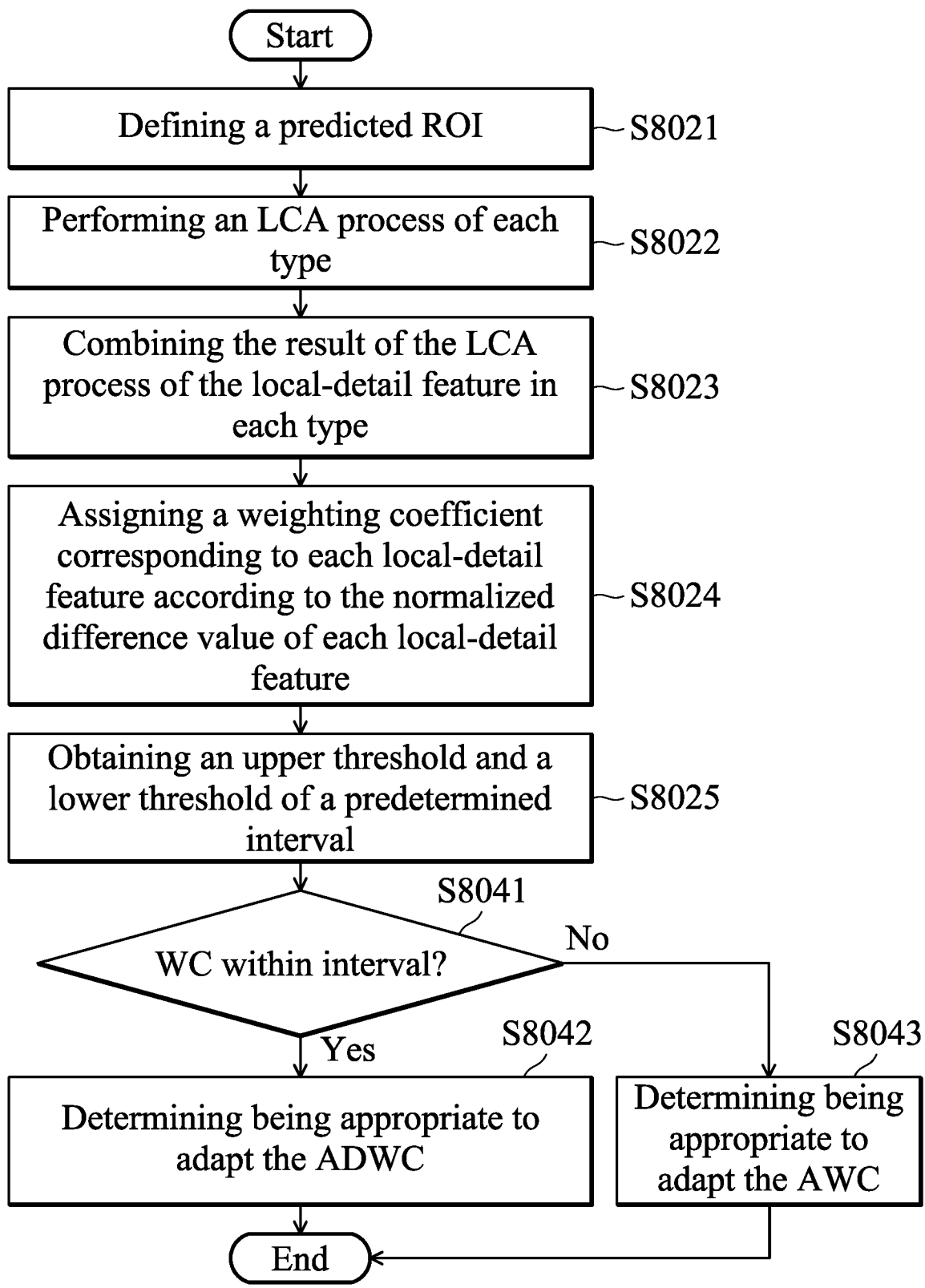
FIG. 8B is a flow chart of the global-context analysis and weighting-coefficient determination steps in accordance with the embodiment of FIG. 8A.

FIG. 8B is a flow chart of the global-context analysis and weighting-coefficient determination steps in accordance with the embodiment of FIG. 8A. For example, the detailed flow of steps S802 and S804 are shown in FIG. 8B, wherein the global-context-analysis is performed in step S802, and the weighting-coefficient determination is performed in step S804.

In step S8021, a predicted ROI is defined. For example, the predicted ROI may be an interested context region, and can be defined by the user or the computation apparatus 120.

In step S8022, a local-context-analysis (LCA) process is performed on each type, and the difference values between the feature values of each type of local-detail feature are calculated and normalized. For example, the LCA is to perform feature extraction and fusion on the different types of sensor data (e.g., video, audio, smell, taste, and tactile sensor data) to obtain the LFF of each type of sensor data.

The computation apparatus 120 may perform a set of specific calculations and analysis on the LFF of the current sensor data of each type to obtain the weighting coefficient corresponding to the LFF of the current sensor data of each type. The calculations of the weighting coefficients can be performed on the video-detail features including the color, texture, and shape, and the acoustic-detail features including the sound volume, pitch, and tone. The LFF of the sensor data in other types can be calculated in a similar manner to obtain the corresponding weighting coefficient.

With regard to the video-detail features, the color feature may include the difference values in density, saturation, and brightness. The texture feature may include the difference values in patterns. The shape feature may include the difference values in lines, relative positions, relative distances, and relative directions. With regard to the acoustic-detail features, the sound-volume feature may include the difference value in acoustic energy. The pitch feature may include the difference value in the acoustic frequency. The tone feature may include the difference values in proportions of harmonics or overtone. Since the property of each local-detail feature is different from each other, the difference value of each local-detail feature should be normalized to evaluate the normalized difference value of each local-detail feature. The normalized difference value indicates the relative importance of each selected LFF in the overall rating, and can be expressed by a natural number which may be a positive integer, a negative integer, or zero.

In some embodiments, the computation apparatus 120 may use local binary patterns to calculate the difference value of each local-detail feature in different types.

In step S8023, the results of the local-context analysis process of each type of local-detail feature are combined. For example, after obtaining the normalized difference value for each type of local-detail feature, the computation apparatus 120 may combine the results of the local-context analysis of all local-detail features of each type.

In step S8024, a weighting coefficient corresponding to each local-detail feature is assigned according to the normalized difference value of each local-detail feature. If the normalized difference value of a specific local-detail feature is greater, the weighting coefficient of the local-detail feature is also greater. If the normalized difference value of a specific local-detail feature is smaller, the weighting coefficient of the local-detail feature is also smaller.

In step S8025, an upper threshold and a lower threshold of a predetermined interval are obtained. For example, the computation apparatus 120 may obtain the upper threshold and lower threshold (e.g., may be defined by the user or the computation apparatus 120) of the predetermined interval of the weighting coefficient defined by the practical condition of the type or application.

In step S8041, it is determined whether the weighting coefficient corresponding to each local-detail feature is within the predetermined interval. When the weighting coefficient corresponding to each local-detail feature is located within the predetermined interval, it indicates that the difference between the feature values of the local-detail features is little, and step S8042 is performed to determine that it is appropriate to adapt the ADWC. When one of the weighting coefficients corresponding to local-detail features is not located within the predetermined interval, it indicates that the difference between the feature values of the local-detail features is large, and step S8043 is performed to determine that it is not appropriate to adapt the ADWC, and the AWC is used.

In an embodiment, three effective LFFs for video objects such as features A, B, and C are selected, and two effective LFFs for acoustic objects such as features D and E are selected. The weighting coefficients corresponding to the features A~E are obtained by performing the local-context analysis on each of the features A~E and normalizing the results. For example, WA=5, WB=2, WC=4, WD=6, and WE=3. If the predetermined interval is between 3~6, it indicates that the lower threshold is 3 and the upper threshold is 6. In this situation, none of the features is biased, and thus the weighting coefficients WA~WE can be set as the ADWCs that are applied to each feature to alternate the relative importance of each feature. However, if the weighting coefficients WA~WE of the features A~E are respectively 7, 2, 4, 6, and 3, the weighting coefficient WA exceeds the upper threshold of the predetermined interval 3~6 having the upper threshold of 7 and the lower threshold of 3. It indicates that the determination result is biased toward feature A, and the computation apparatus 120 may adapt the AWC.

Specifically, in order to improve the capability, accuracy, and prediction ability of object recognition, the computation apparatus 120 may adapt effective feature information of different types according to user's needs, determine which weighting coefficient is to be selected according to the results of the global-context analysis, and fuse the selected features. Additionally, the computation apparatus 120 may feed the results of the global-object recognition back to the local-object-recognition model. For example, before the computation apparatus 120 fuses the GDFSs into the GFF, the computation apparatus 120 has to select effective local-fusion features. The effective or ineffective features may refer to whether the feature is capable of improving the recognition accuracy. For example, the texture of the skin is an effective feature for predicting the user's age, and the color of the skin is an ineffective feature for predicting the user's age. That is, with regard to the sensor data in different types, the user may set which local-fusion features are effective features while performing the global-object recognition or local-object recognition.

Figures 1, 8C:
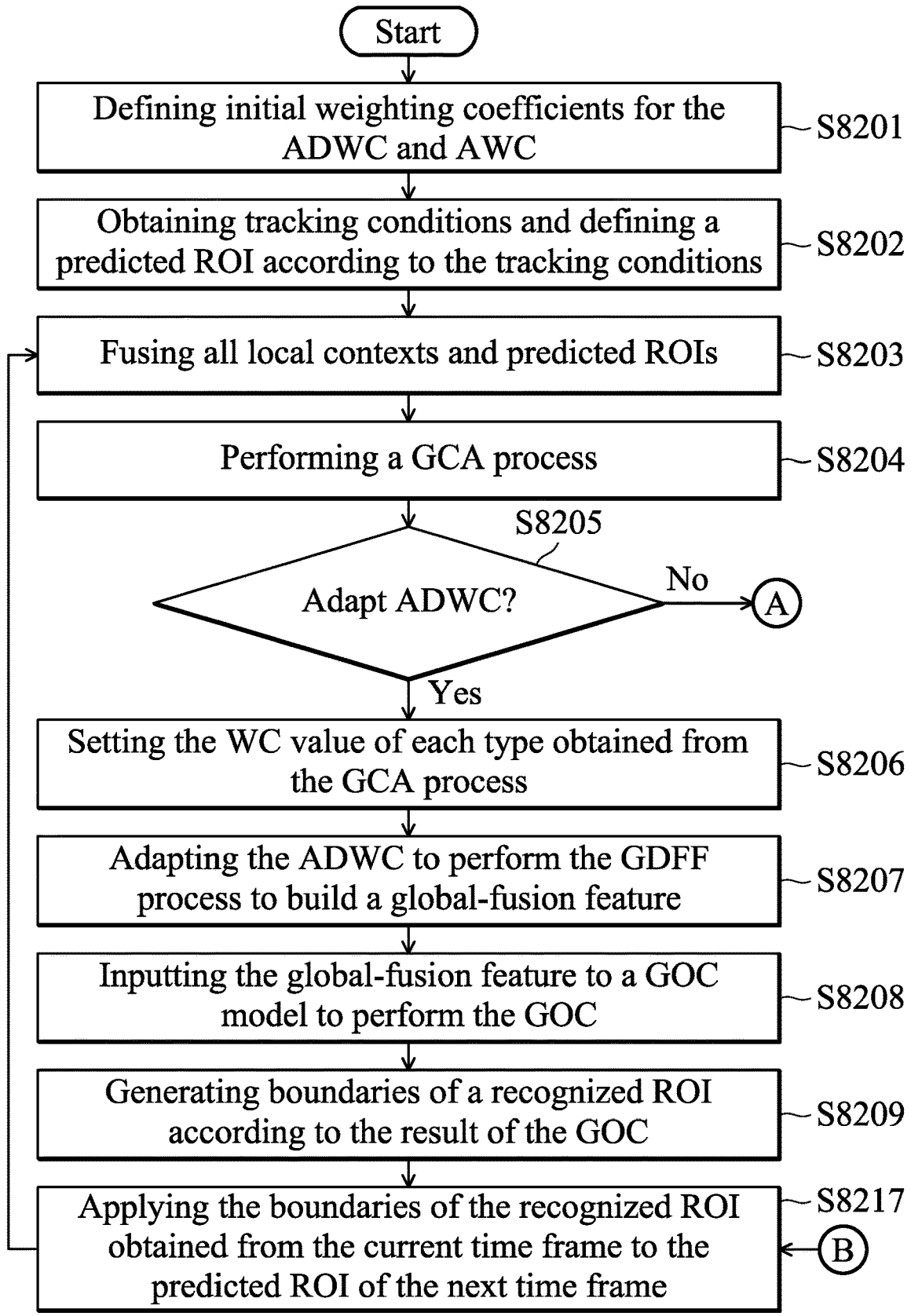
Figures 2, 8C:
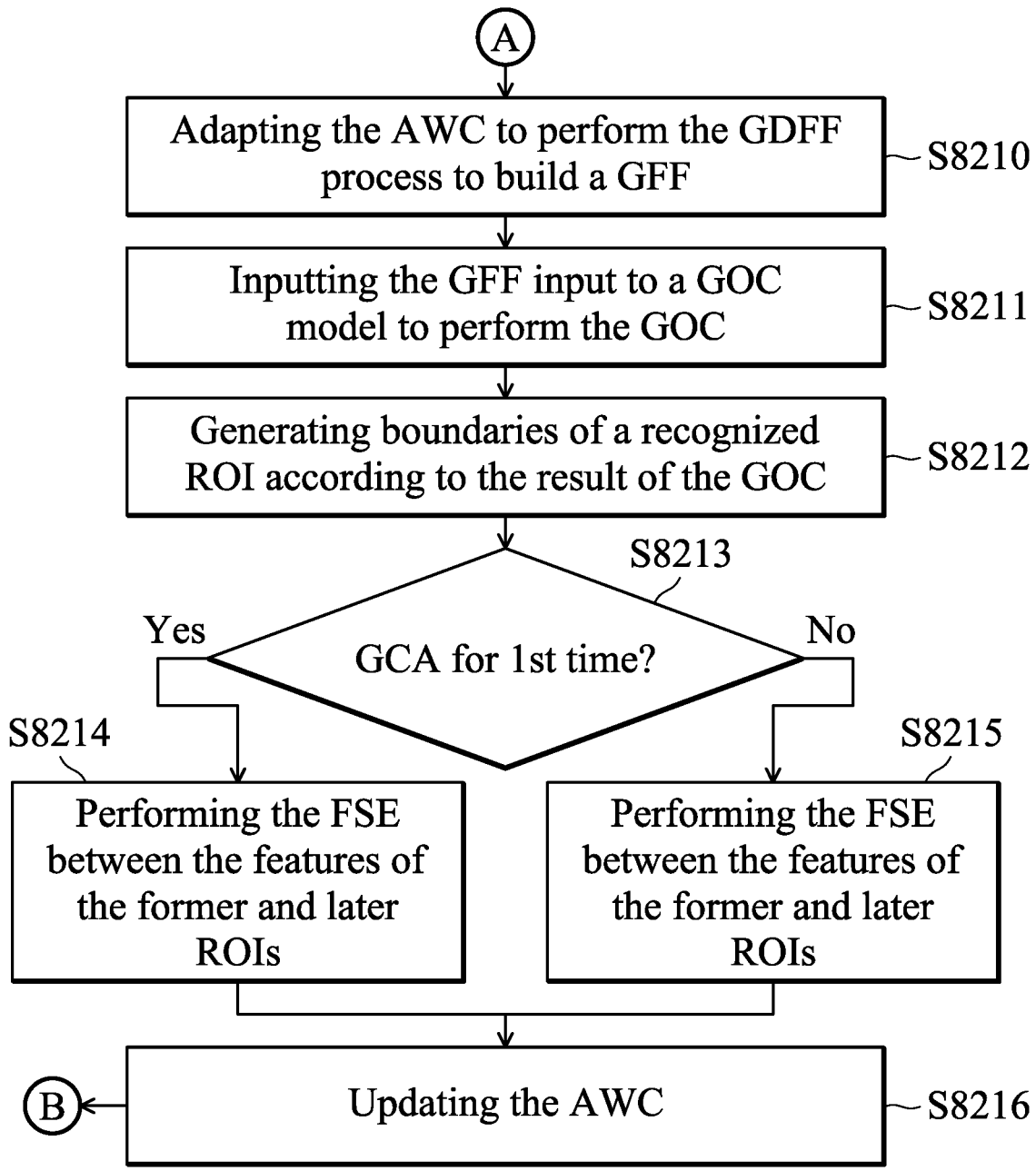

FIGS. 8C-1 and 8C-2 are portions of a flow chart of the global-detail-feature fusion and global-object recognition in accordance with an embodiment of the disclosure.

In step S8201, initial weighting coefficients (WCs) for the ADWC and AWC are set.

In step S8202, tracking conditions are obtained, and a predicted ROI is defined according to the tracking conditions. For example, the tracking conditions can be defined by the user, such as a person wearing clothes having a specific color or texture, or a person having the fastest speed, but the disclosure is not limited thereto. Then, the computation apparatus 120 may define the predicted ROI for each type of sensor data.

In step S8203, all local contexts and predicted ROIs are fused. For example, the context and the predicted ROI of each type are fused. If step S8203 is performed for the first time, the fused ROI generated by the fusion process can be regarded as an initial ROI.

In step S8204, a global-context analysis (GCA) process is performed, wherein the details of the global-context analysis can be referred to the flow chart in FIGS. 8A and 8B.

In step S8205, it is determined whether it is appropriate to adapt the ADWC. The details of step S8205 can be referred to the flow chart in FIG. 8B, and thus will be omitted here. When it is determined that it is appropriate to use the ADWC, step S8206 is performed. When it is determined that it is not appropriate to use the ADWC, step S8210 is performed.

In step S8206, the weighting coefficient value of each type obtained from the global-context-analysis process is set to the ADWC. For example, when the weighting coefficient value of each local-fusion feature of each type is located within the predetermined interval, it indicates that the results of the global-object recognition will not be biased toward a certain feature, and thus the weighting coefficient obtained from the global-context analysis can be set to the ADWC.

In step S8207, the ADWC is adapted to perform the GDFF process to build a global-fusion feature. For example, since it is determined that it is appropriate to adapt the ADWC and the weighting coefficient obtained from the global-context analysis is set to the ADWC, the computation apparatus 120 may perform calculation of the GDFF process according to the weighting coefficient of each local-fusion feature to generate a global-fusion feature.

In step S8208, the global-fusion feature is input to a global-object-recognition model to perform the global-object recognition. For example, the global-object-recognition model may be the global-object-recognition model 920 shown in FIG. 9A-2.

In step S8209, boundaries of a recognized ROI are generated according to the results of the global-object recognition. It should be noted that the flow of the global-object recognition of the current time frame is finished after completing step S8209, and the flow of the global-object recognition of the next time frame is ready to be performed.

In step S8210, the AWC is adapted to perform the GDFF process to build a global-fusion feature. For example, since it is determined that it is appropriate to adapt the AWC and the weighting coefficient obtained from the global-context analysis may be biased toward a certain feature, the computation apparatus 120 may apply the AWC to perform the GDFF to build a global-fusion feature.

In step S8211, the global-fusion feature is input to a global-object-recognition model to perform the global-object recognition. For example, the global-object-recognition model may be the global-object-recognition model 920 shown in FIG. 9A-2.

In step S8212, boundaries of a recognized ROI are generated according to the results of the global-object recognition. It should be noted that, after completing step S8212, step S8213 is performed to determine whether the global-context analysis is performed for the first time. If the determination result of step S8213 is "yes", step S8214 is performed; if the determination result of step S8213 is "yes", step S8215 is performed.

In step S8214, the feature-similarity evaluation (FSE) between the features of the former ROI and the later ROI is performed. The global-context analysis is performed for the first time in step S8214, the former ROI indicates the ROI before performing the global-object recognition for the current time frame, and the later ROI indicates the ROI after performing global-object recognition for the current time frame.

In step S8215, the feature-similarity evaluation between the features of the former ROI and the later ROI is performed. The global-context analysis is not performed for the first time in step S8215, the former ROI indicates the ROI after performing the global-object recognition for the previous time frame, and the later ROI indicates the ROI before performing global-object recognition for the current time frame.

The Bhattacharyya distance is generally used in a feature-similarity evaluation between the features of the former ROI and the later ROI in steps S8214 and S8215. Since the properties of each feature are different, the feature value should be normalized before performing the evaluation. If the similarity of the same feature value in the former ROI and the later ROI is higher, the weighting coefficient corresponding to the feature is also greater. The AWC can be obtained after normalizing the weighting coefficient of the feature.

In step S8216, the AWC is updated. It should be noted that the updated AWC is used for processing the data in the next time frame.

In step S8217, the boundaries of the recognized ROI obtained from the current time frame are applied to the predicted ROI of the next time frame. Then, the flow of steps S8203~S8207 is repeatedly performed.

Figure 8D:
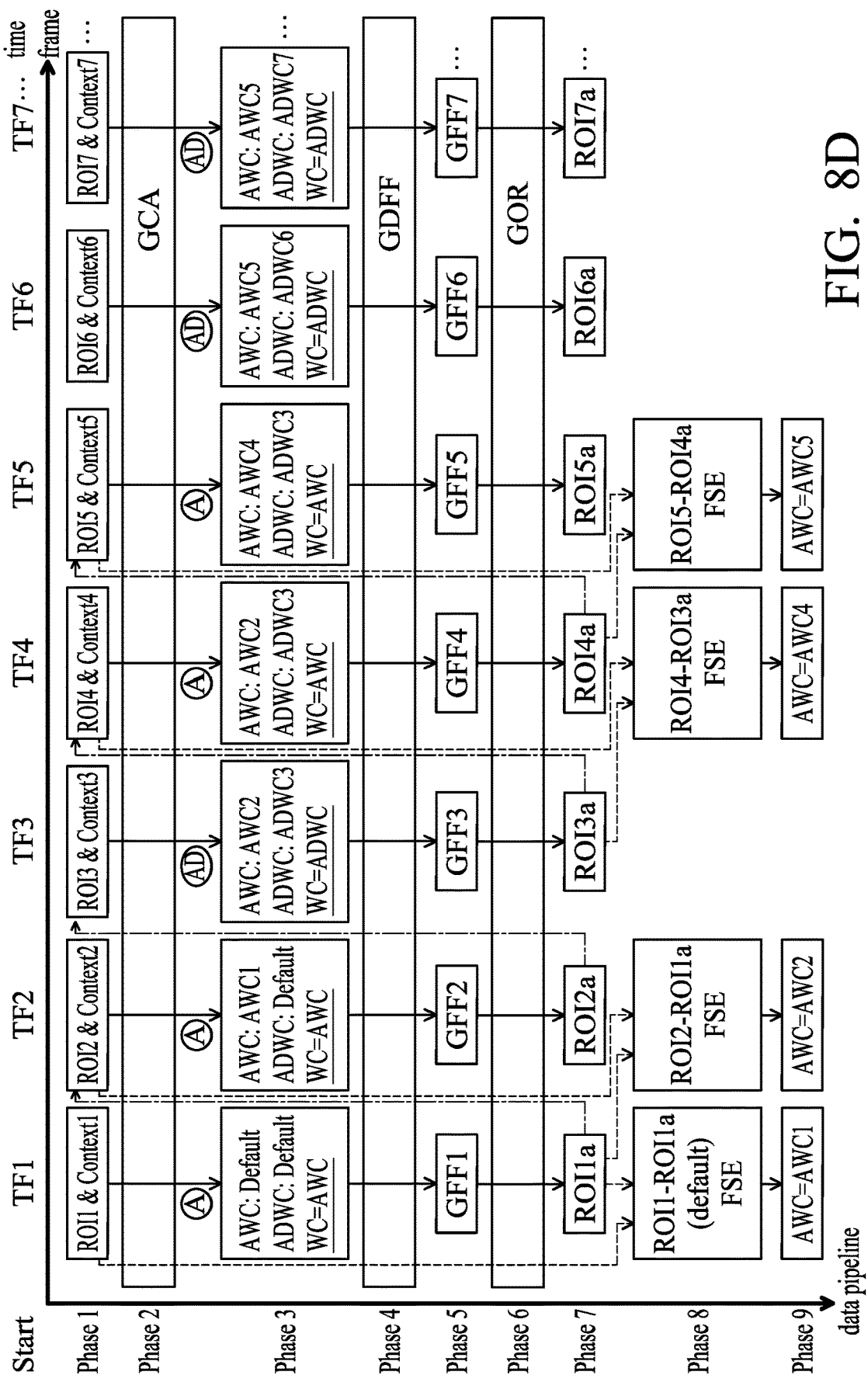
FIG. 8D is a diagram of the data pipeline of the global-detail-feature fusion and global-object recognition in accordance with an embodiment of the disclosure.

FIG. 8D is a diagram of the data pipeline of the global-detail-feature fusion and global-object recognition in accordance with an embodiment of the disclosure. The following embodiments are described with reference to FIGS. 8C-1, 8C-2, and 8D.

In FIG. 8D, phase 1~phase 9 labeled on the left side denote different phases of the data pipeline of the global-detail-feature fusion and global-object recognition. TF1~TF7 denote time frames. ROI1~ROI7 denote the ROIs within time frames TF1~TF7, and Context1~Context7 denote the context regions within time frame TF1~TF7.

In phase 1, local-context fusion and predicted-ROI fusion are performed. In time frame TF1 being the first time frame, the fused-context region and the fused ROI can be used to perform the global-context analysis (GCA) in phase 2. The determination for using the ADWC or AWC is set to a default value in time frame TF1.

In phase 2, it is determined which weighting coefficient is to be adapted according to the results of the GCA. If it is determined to adapt the AWC, phase 3 in FIG. 8D is labeled with A. If it is determined to adapt the ADWC, phase 3 in FIG. 8D is labeled with AD.

In phase 4, the GDFF is performed according to the selected weighting coefficient to generate a GFF in phase 5.

In phase 6, the global-object recognition is performed according to the GFF in phase 5. Then, in phase 7, the boundaries of the recognized region are generated according to the results of the global-object recognition.

In phase 8, the feature-similarity evaluation between the features of the former ROI and the later ROI is performed. If the global-context analysis is performed for the first time (e.g., within time frame TF1), the former ROI indicates the ROI before performing the global-object recognition for the current time frame, and the later ROI indicates the ROI after performing global-object recognition for the current time frame. If the global-context analysis is not performed for the first time, the former ROI indicates the ROI after performing the global-object recognition for the previous time frame, and the later ROI indicates the ROI before performing global-object recognition for the current time frame.

In phase 9, the AWC is updated. For example, if the label of phase 3 is A, it indicates that the AWC is adapted. Thus, the AWC is updated in phase 9. If the label of phase 3 is AD, it indicates that the ADWC is adapted, and thus phase 8 and phase 9 can be omitted. For example, it is determined to adapt the AWC in time frames TF1, TF2, TF4, and TF5, the feature-similarity evaluation between the features of the former ROI and the later ROI in phase 8 is performed.

Additionally, the updated AWC in the current time frame in phase 9 will be adapted in phase 3 in the next time frame. For example, the AWC generated in phase 9 in time frame TF1 is updated to AWC1, and the AWC adapted in phase 3 in time frame TF2 is AWC1, and so forth.

If it is determined to adapt the ADWC in phase 3, the value of the ADWC is updated in the current frame. For example, it is determined to adapt the ADWC in phase 3 in time frame TF3, the ADWC is updated to the ADWC3 in the current time frame, and so forth.

It should be noted that the boundaries of the recognized ROI such as ROI1a~ROI7a obtained in phase 7 of time frames TF1~TF7 will be used in the next time frame. For example, the boundary of the recognized ROI ROI1a obtained within time frame TF1 will be applied to the boundary of the predicted ROI within time frame TF2, and so forth.

Figure 8E:
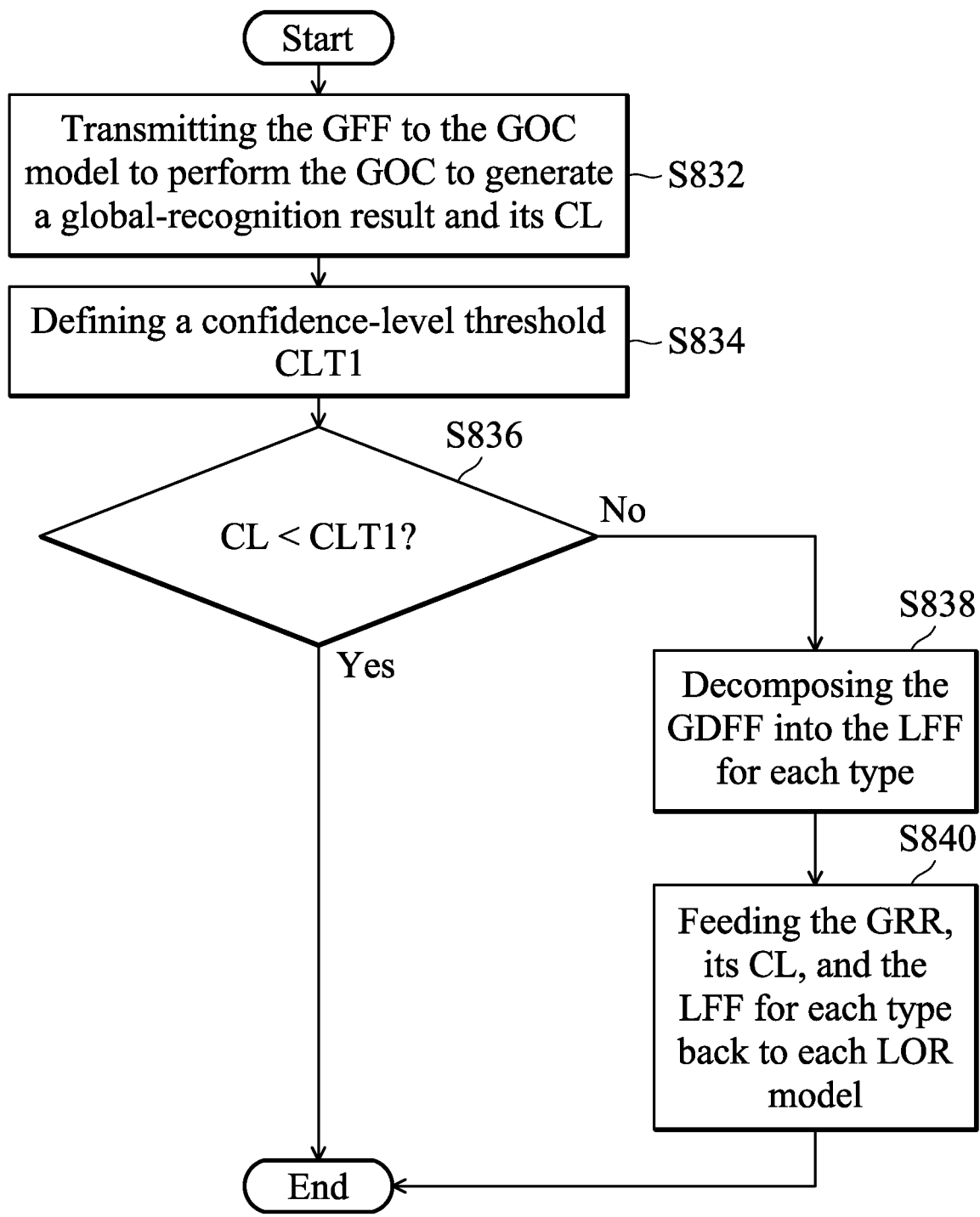
FIG. 8E is a flow chart of the global feedback in the recognition result feedback and enhancement step in accordance with an embodiment of the disclosure.

FIG. 8E is a flow chart of the global feedback in the recognition result feedback and enhancement step in accordance with an embodiment of the disclosure.

In step S832, the GFF is transmitted to the global-object recognition model to perform the global-object recognition to generate a global-recognition result (GRR) and its confidence level (CL). For example, the global-recognition result output by the global-object-recognition model indicates a person (e.g., global object) is detected from the sensor data in different types. The global-recognition result is more reliable with a higher confidence level.

In step S834, a confidence-level threshold (CLT) is defined. For example, the confidence-level threshold can be manually set by the user or automatically set by the computation apparatus 120, and the confidence-level threshold may indicate the lowest reliability required for the global-recognition result.

In step S836, it is determined whether the confidence level is lower than the confidence-level threshold. If so, the flow ends; if not, step S838 is performed. For example, if the confidence level of the global-recognition result is lower than the confidence-level threshold, it indicates that the reliability of the current global-recognition result is low, and the computation apparatus 120 may update the global-recognition result after the sensor data is updated or the object in the scene is moved to another place. If the confidence level of the global-recognition result is not lower than the confidence-level threshold, it indicates that the reliability of the global-recognition result is kept at a certain level.

In step S838, the GDFF is decomposed into a local-fusion feature of each type. For example, since the reliability of the global-recognition result is at a certain level, the GDFF used for the global-object recognition in the global-object-recognition model can be decomposed into a local-fusion feature of each type.

In step S840, the global-recognition result, its confidence level, and each type of local-fusion feature are fed back to each local-object-recognition model (e.g., the local-object-recognition module 1313 in FIG. 2).

By performing the flow in FIG. 8E, each local-object-recognition model may use the feedback path to perform co-learning between the local-object-recognition model and the global-object-recognition model, thereby automatically enhancing the capability and accuracy of the local-object recognition.

Figure 8F:
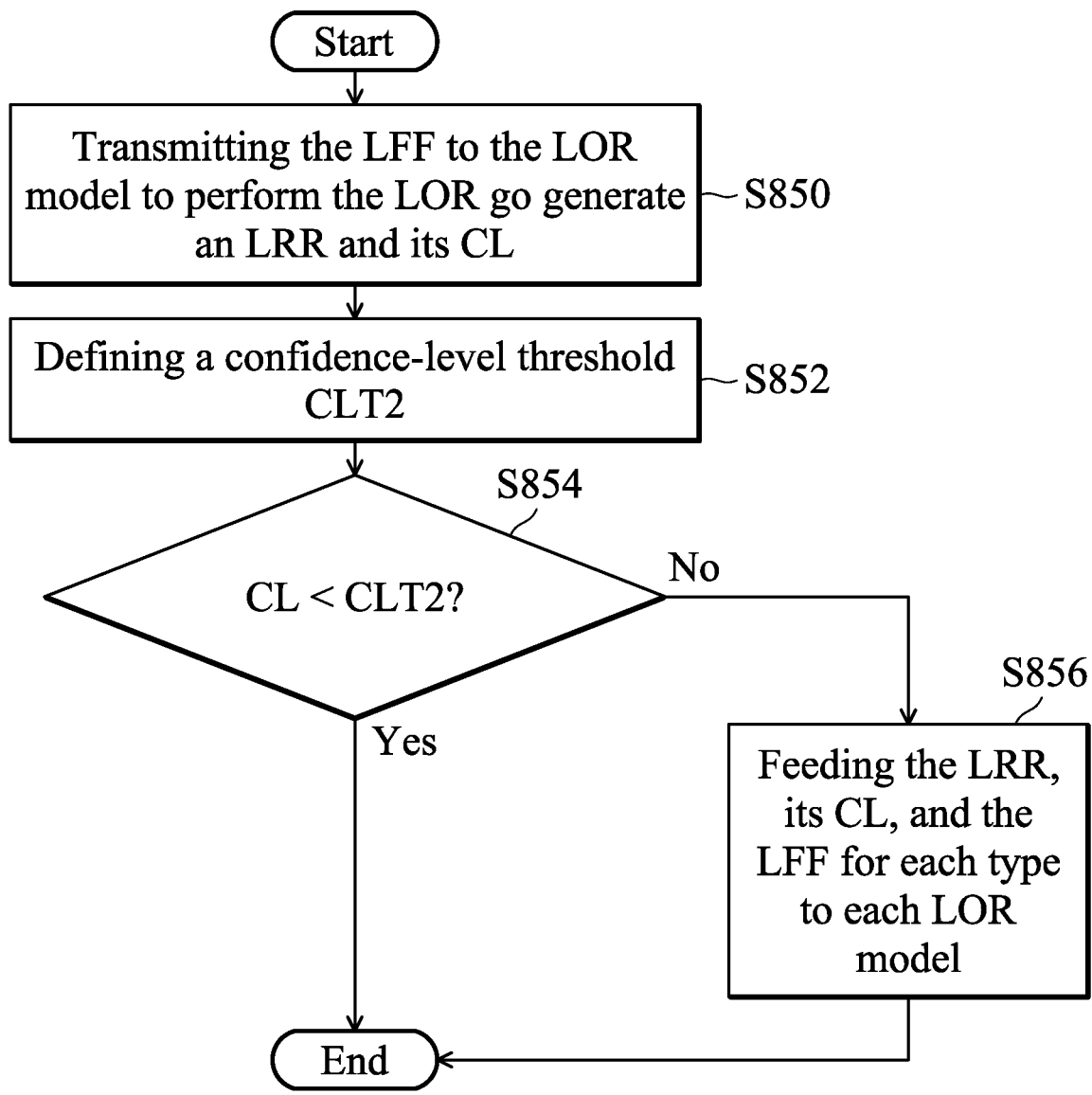
FIG. 8F is a flow chart of the local feedback in the recognition result feedback and enhancement step in accordance with an embodiment of the disclosure.

FIG. 8F is a flow chart of the local feedback in the recognition result feedback and enhancement step in accordance with an embodiment of the disclosure. In the flow of FIG. 8E, the global feedback is described, and the co-learning between the local-object-recognition model and the global-object-recognition model is performed. Additionally, a similar feedback can be used in the local terminals, that can be regarded as local feedback.

In step S850, the LFF is sent to the local-object-recognition model to perform the local-object recognition to generate a local-recognition result (LRR) and its confidence level (e.g., can be included in the LIID list). For example, the local-recognition result output from the local-object-recognition model may indicate a person detected from the sensor data in the same type. The local-recognition result is more reliable with a higher confidence level.

In step S852, a confidence-level threshold CLT2 is defined. For example, the confidence-level threshold can be manually set by the user or automatically set by the computation apparatus 120, and the confidence-level threshold may indicate the lowest reliability required for the local-recognition result. It should be noted that the confidence-level threshold used in the local-object recognition may be the same with or different from that used in the global-object recognition.

In step S854, it is determined whether the confidence level is lower than the confidence-level threshold. If so, the flow ends; if not, step S856 is performed. For example, if the confidence level of the local-recognition result is lower than the confidence-level threshold, it indicates that the reliability of the current local-recognition result is low, and the computation apparatus 120 may update the local-recognition result after the sensor data is updated or the object in the scene is moved to another place. If the confidence level of the local-recognition result is not lower than the confidence-level threshold, it indicates that the reliability of the local-recognition result is kept at a certain level.

In step S856, the local-recognition result, its confidence level, and each type of local-fusion feature are fed back to each local-object-detection model (e.g., the local-object-detection and correspondence module 1311 in FIG. 2).

By performing the flow in FIG. 8F, each local-object-detection model may use the feedback path to perform self-learning between the local-object-detection model and the local-object-recognition model, thereby automatically enhancing the capability and accuracy of the local-object detection. In some embodiments, each local-object-detection model and local-object-recognition model may selectively refer to the feedback information, or determine how to use the feedback information according to practical conditions and needs.

Figures 1, 9A:
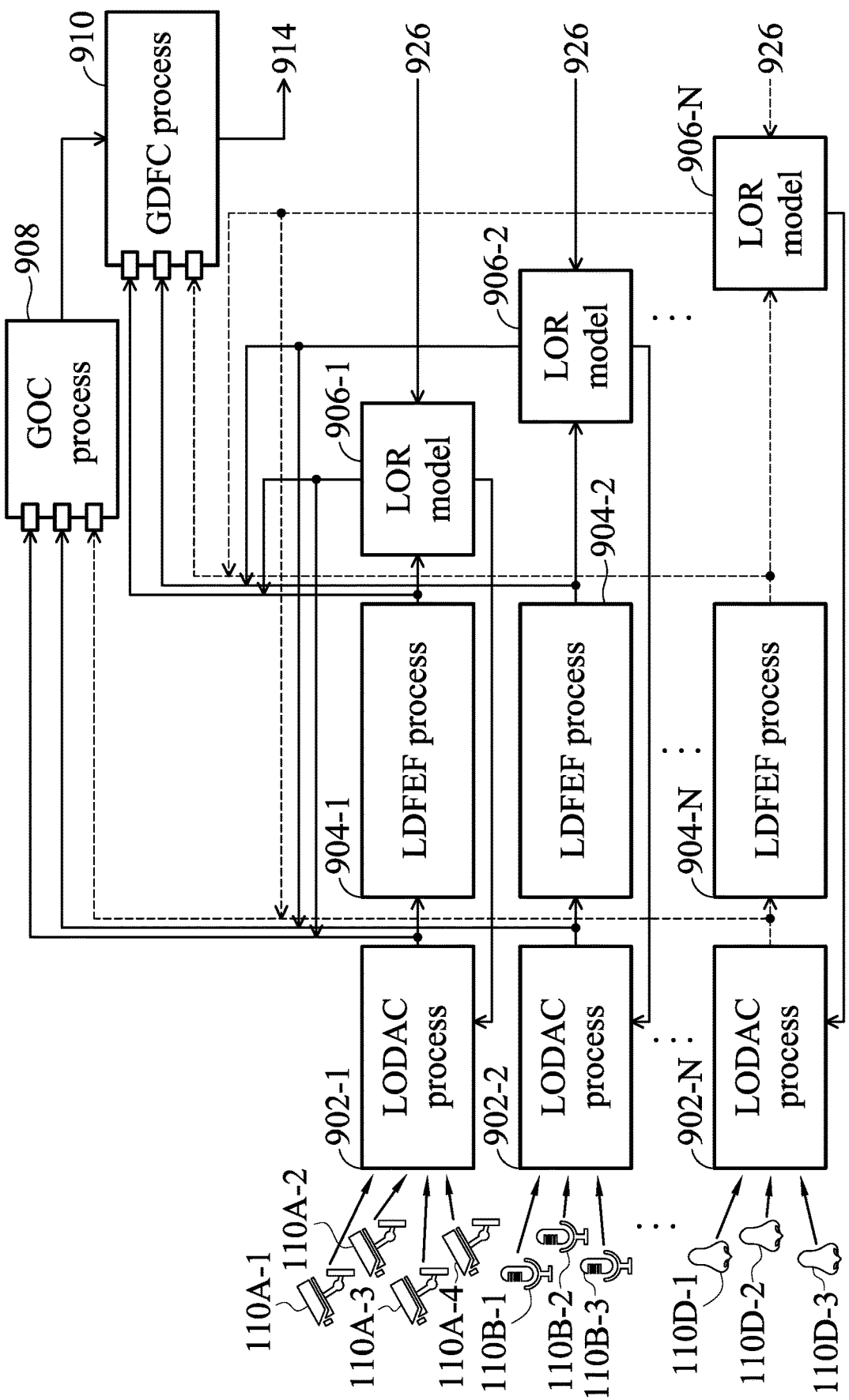
Figures 2, 9A:
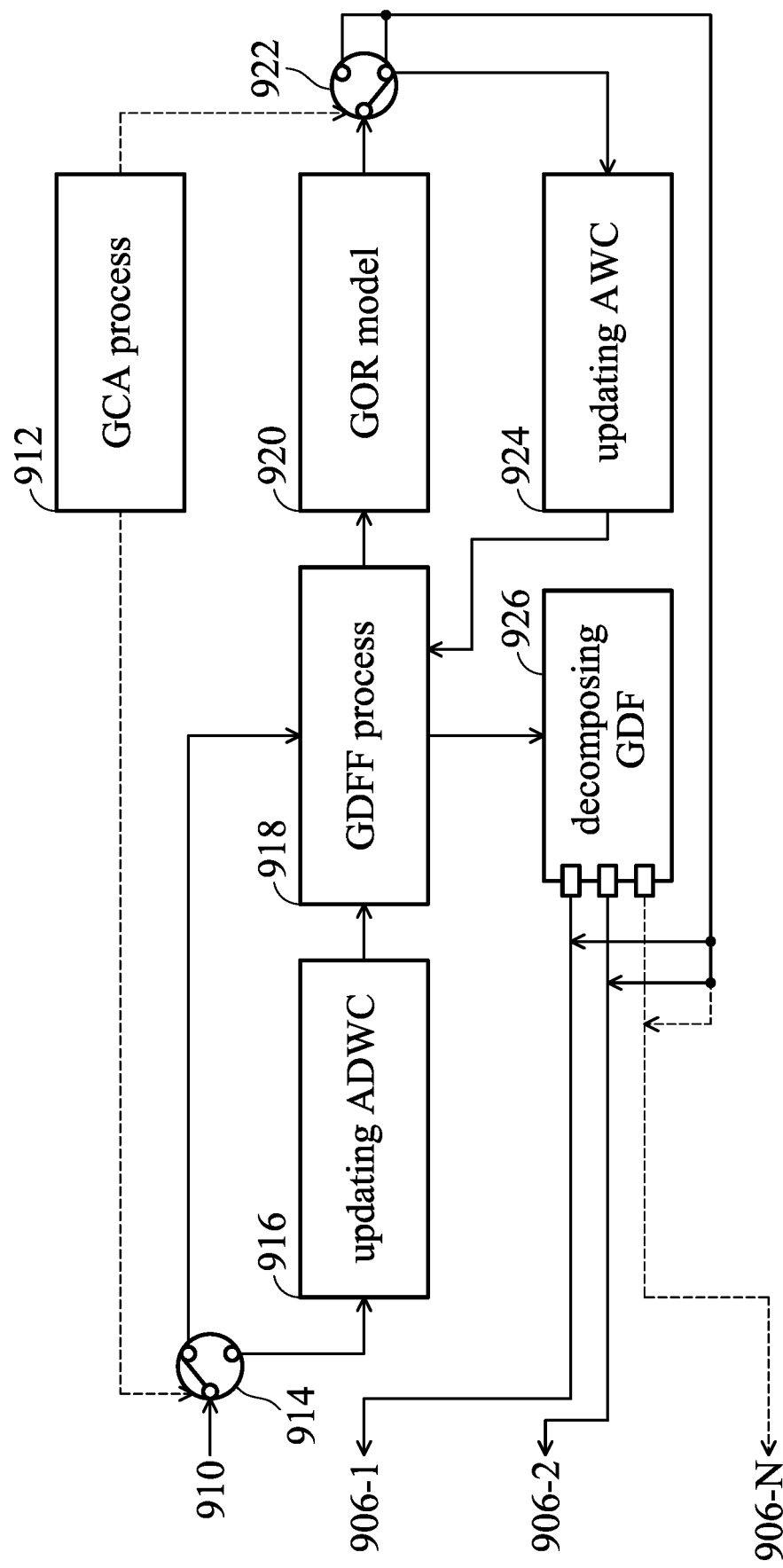

FIGS. 9A-1 and 9A-2 are portions of a block diagram of a surveillance method in accordance with an embodiment of the disclosure.

In an embodiment, in blocks 902-1~902-N, the computation apparatus 120 performs a local-object-detection-and-correspondence (LODAC) process which includes a local-object-detection process and a local-object-correspondence process. In each of blocks 902-1~902-N, sensor data is received from each type of sensor. For example, in block 902-1, video data captured by one or more cameras 110A (e.g., cameras 110A-1~110A-4) is received. In block 902-2, acoustic data captured by one or more microphones (e.g., microphones 110B-1~110B-3) is received. In block 902-N, smell data detected by one or more smell sensors 110D (e.g., smell sensors 110D-1~110D-3) is received. In each block 902, an LOID list and a corresponding LRFS are generated for each type of sensor data. For example, the LRFSs corresponding to the different types of sensor data may include information about the direction, distance, roughness, and structure of local objects from the different types of sensor data. In addition, the flow of building the LOID list and corresponding LRFS for the video objects and acoustic objects can be referred to in the embodiments of FIGS. 3A-3B and FIG. 4.

In blocks 904-1~904-N, the computation apparatus 120 may perform a local-detail-feature extraction and fusion (LDFEF) process of the sensor data in different types, and the local-detail-feature extraction and fusion process includes a local-object-detail-feature-extraction process and a local-detail-feature-fusion process. For example, the computation apparatus 120 may, according to the LOID list, sequentially perform the local-detail-feature extraction process on the sensor data corresponding to each local object to build an LDFS of the sensor data corresponding to each local object. The computation apparatus 120 may, according to the LOID list, perform a local-detail-feature-fusion process to sequentially fuse the LDFS of the sensor data corresponding to each local object into a local-fusion feature (LFF) of each local object.

In blocks 906-1~906-N, the computation apparatus 120 may input the LFF of each local object to a local-object-recognition model to perform a local-object-identity-recognition process, and label the recognition result with an LIID, and merge each LIID to generate an LIID list.

In block 908, the computation apparatus 120 may perform a global-object-correspondence (GOC) process to generate a GOID list and a GRFS corresponding to each global object. For example, the details for the global-object-correspondence process can be referred to in the embodiment of FIG. 5. However, the correspondence process is not only performed on the video objects and acoustic objects here, but the flow is similar. For example, the computation apparatus 120 may compare the time stamps of local objects in the LOID list for the different types of sensor data one by one. When the time stamps match each other, the computation apparatus 120 may further compare the world-positioning-coordinate information of the local objects having matching time stamps. When the world-positioning-coordinate information of the local objects also match each other, the computation apparatus 120 further determines whether the LRFSs of the different types of sensor data match each other. When the LRFSs match each other, the computation apparatus 120 may link the successfully matched local object and corresponding LRFS in different types to build a global object and corresponding GRFS, wherein each global object has a corresponding GOID.

In block 910, the computation apparatus 120 may perform a global-detail-feature-correspondence (GDFC) process. For example, the computation apparatus 120 may combine the LOID list and corresponding LFF of different types corresponding to each global object in the GOID list into a GDFS in the GOID list. Since the GOID list includes the successfully matched different types of local objects that have corresponding LFFs, the computation apparatus 120 may link the LFFs corresponding to the different types of local objects to generate a GDFF that corresponds to the global object.

In block 912, the computation apparatus 120 may perform a global-context-analysis (GCA) process. For example, the computation apparatus 120 may analyze a context region corresponding to each local object in different types of each global object in the GOIS list. Using video objects as an example, referring to FIG. 7A, the computation apparatus 120 may perform a context analysis on the spatial range of the context region 730 within the video frame 700. Using acoustic objects as an example, referring to FIG. 7B, the computation apparatus 120 may perform a context analysis on the temporal range of the context region 780 within the acoustic segment 750.

The computation apparatus 120 may further determine whether any detail feature in the context region in each local object is obvious. For example, the video detail features includes colors, textures, and shapes, and the acoustic detail features includes the sound volume, pitch, and tone. The results of the context-analysis process may be to select either the ADWC or the AWC for the subsequent global-detail-feature fusion process. In addition, each weighting coefficient corresponds to a detail feature. Accordingly, there are six weighting coefficients for the video data and acoustic data.

In selector 914, if it is determined to use the ADWC to perform the global-detail-feature fusion process in block 912, the LIID list, GOID list and corresponding GDFS generated in block 910 are input to block 916, and the computation apparatus 120 may update the ADWC.

In selector 914, if it is determined to use the AWC to perform the global-detail-feature fusion process in block 912, the LIID list, GOID list and corresponding GDFS generated in block 910 are input to block 918 to perform the global-detail-feature fusion process. In addition, the updated AWC generated in block 924 will be sent to block 918 to perform the global-detail-feature fusion process. For example, the AWC generated in block 924 is determined and updated according to the recognition result of the global-object-recognition model in the previous time frame.

In block 918, the computation apparatus 120 may perform the global-detail-feature fusion (GDFF) process. As described above, the input coefficients of the global-detail-feature fusion process may be the ADWC or AWC, depending on the results of the global-context analysis in block 912. Specifically, the computation apparatus 120 may perform the feature-fusion process again on the GDFS corresponding to each global object to obtain a global-fusion feature (GFF) corresponding to each global object.

In block 920, the computation apparatus 120 may input the global-fusion feature into a global-object-recognition model to perform the identity recognition of the global object to generate a GIID list. For example, the computation apparatus 120 may assign a GIID to each global-fusion feature, and record the GIID in the GIID list. In addition, the GIID list further records the recognition result and its confidence level of the global-object-recognition model.

In selector 922, if the determination result in block 912 is to use the ADWC to perform the global-detail-feature fusion process, the recognition result and its corresponding confidence level (e.g., both can be regarded as feedback information) output by block 920 will be input to the local-object-recognition model in different types such as blocks 906-1~906-N. In some embodiments, if the confidence level corresponding to the recognition result in a specific type is less than a predetermined ratio (e.g., 80%), selector 922 will not feed the recognition result and its confidence level back to the local-object-recognition models in blocks 906-1~906-N. In some embodiments, the local-object-recognition models in blocks 906-1~906-N may determine whether to use the feedback information.

In block S924, the computation apparatus 120 may update the AWC, such as updating the AWC according to the previous recognition result of the global-object-recognition model.

In block 926, the computation apparatus 120 may decompose the global-detail feature (GDF) to obtain local-detail features in different types. It should be noted that the local-detail features obtained by the decomposition in block 926 will be input to the local-object-recognition models in blocks 906-1~906-N.

Accordingly, each of the local-object-recognition models in blocks 906-1~906-N may be adjusted or updated according to the recognition result and its confidence level in the corresponding type (e.g., from block 920 through selector 922), and the local-detail features in the corresponding type (e.g., from block 926), so that a more accurate recognition result of the local-object recognition can be obtained.

Figures 1, 9B:
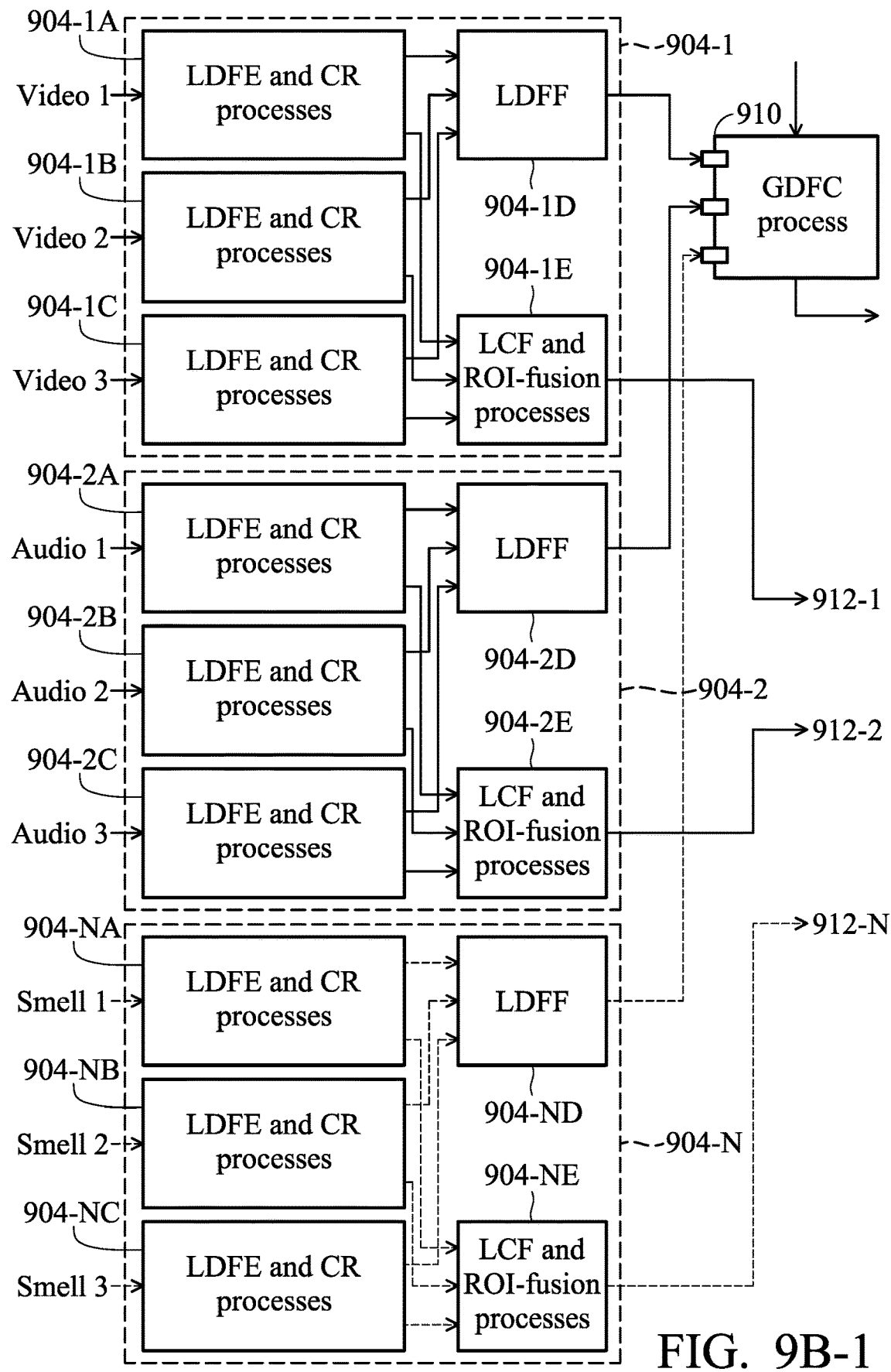
Figures 2, 9B:
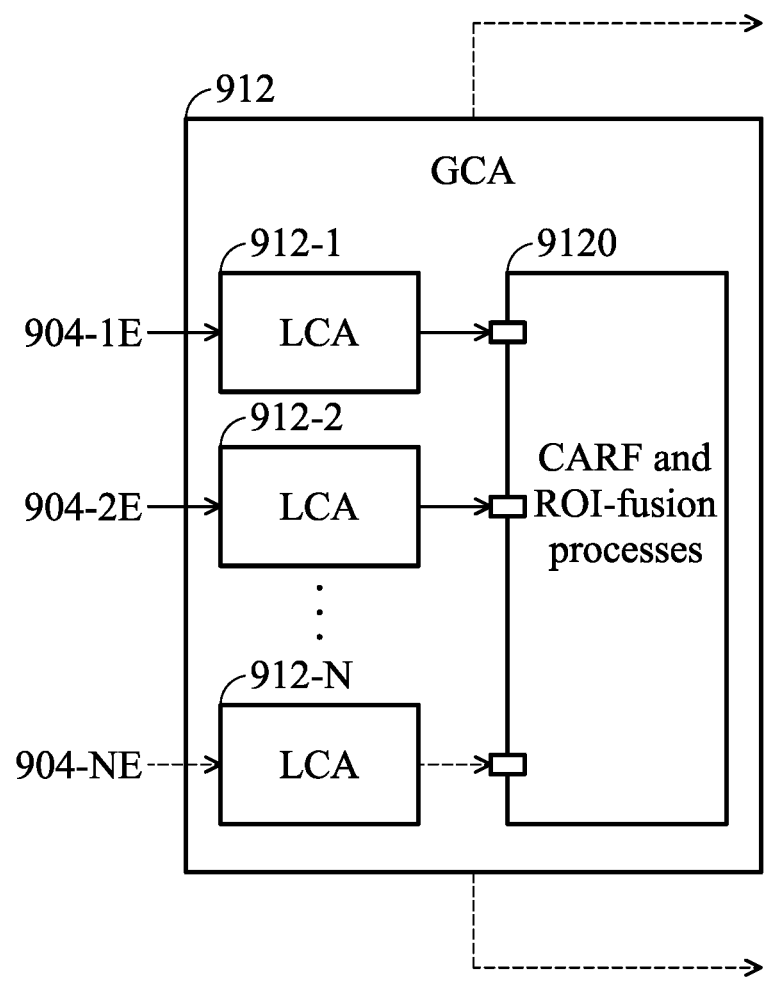

FIGS. 9B-1 and 9B-2 are portions of a detailed block diagram of the global-context analysis process in accordance with the embodiment of FIGS. 9A-1 and 9A-2. In an embodiment, the global-context analysis process performed in block 912 of FIGS. 9A-1 and 9A-2 can be referred to content in the FIGS. 9B-1 and 9B-2. In addition to performing the local-detail-feature-extraction process and the local-detail-feature-fusion process, each of blocks 904-1~904-N in FIGS. 9A-1 and 9A-2 may also perform a context-retrieving process and context-fusion process in a corresponding type, as illustrated in blocks 904-1~904-N in FIGS. 9B-1 and 9B-2.

Specifically, taking block 904-1 as an example, after the video data Video1, Video2, and Video 3 captured by the cameras 110A-1~110-3 are processed by block 902-1 in FIG. 9A-1, the video data Video1, Video2, and Video3 are still input to block 904-1. That is, the video data captured by each camera 110A will be input to block 904-1 to perform the local-detail-feature-extraction (LDFE) process and the context-retrieving (CR) process, such as blocks 904-1A, 904-1B, and 904-1C in FIG. 9B-1. The LDFF obtained from blocks 904-1A~904-1C are input to block 904-1D to perform the local-detail-feature-fusion process to generate a LOID list and a local-fusion feature that corresponds to video objects that are input to block 910 to perform the GDFF-building process.

In addition, the context-retrieving process performed in each of blocks 904-1A, 904-1B, and 904-1C, for example, may refer to the recognized video object and obtain the context region and predicted ROI in the corresponding video frame. In block 904-1E, the computation apparatus 120 may perform a local-context-fusion process and ROI-fusion process to fuse the context regions and predicted ROIs respectively from blocks 904-1A, 904-1B, and 904-1C to obtain a fused-context region and a fused ROI. Blocks 904-2 (e.g., for acoustic data Audio1, Audio2, and Audio3) and 904-N (e.g., for smell data Smell1, Smell2, and Smell3) in FIGS. 9B-1 and 9B-2 may perform similar processes on the sensor data in the corresponding type to obtain the fused-context region and fused ROI in the corresponding type.

The fused-context regions and the fused ROIs obtained from blocks 904-1~904-N are input to corresponding blocks 912-1~912-N to perform a local-context-analysis (LCA) process, and the LCA result of each of blocks 912-1~912-N is transmitted to block 9120 to perform a context-analysis-result-fusion (CARF) process and an ROI-fusion process. The computation apparatus 120 may determine whether to use the ADWC or AWC to perform the GDFF process according to the fused-context result generated by block 9120.

Figure 9C:
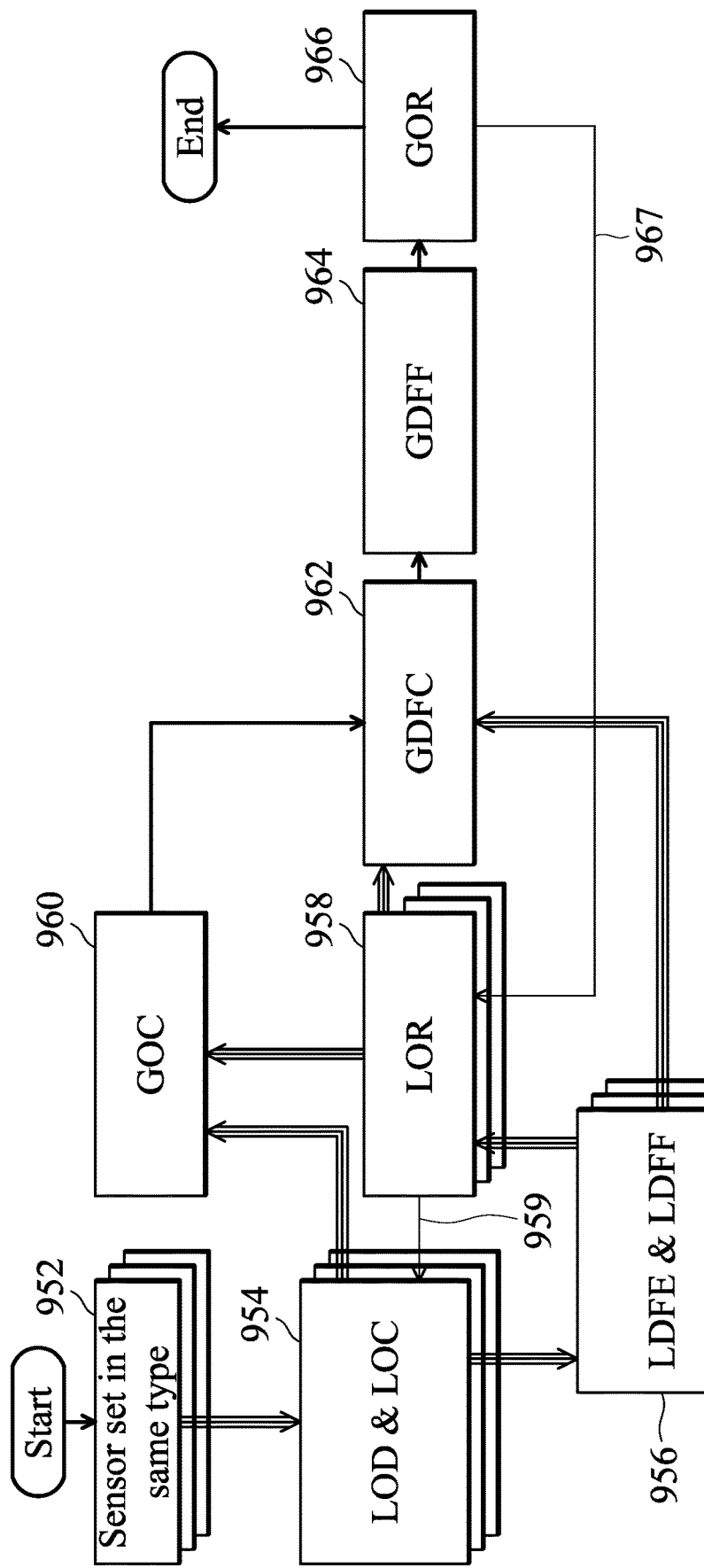
FIG. 9C is a flow chart of a surveillance method using multi-dimensional sensor data in accordance with an embodiment of the disclosure.

FIG. 9C is a flow chart of a surveillance method using multi-dimensional sensor data in accordance with an embodiment of the disclosure. The diagrams in FIGS. 9A-1~9A-2 and 9B-1~9B-2 can be combined and simplified into the flow in FIG. 9C.

Referring to both FIG. 9C and FIG. 2, in block 952, the sensor data is obtained using the sensor set in the same type. For example, the sensor data obtained by the sensors in the same type is sent to the corresponding local-object detection and correspondence module 1311.

In block 954, a local-object detection and correspondence process is performed. For example, the local-object detection and correspondence module 1311 may receive the sensor data from the cameras 110A, microphones 110B, taste sensor 110C, smell sensors 110D, and tactile sensors 110E, and perform the local-object detection and correspondence process on each type of sensor data to generate a LOID list and an LRFS for each type.

In block 956, a local-detail-feature extraction and fusion process is performed. For example, the local-object feature extraction and fusion module 1312 may perform a local-feature-extraction and fusion process including a local-detail-feature extraction (LDFE) process and a local-object-fusion (LDFF) process. For example, the computation apparatus 120 may, according to the LOID list and LRFS generated by the local-object-recognition module 131, extract the local-detail features from each type of sensor data to build the LDFS for each type. Then, the computation apparatus 120 may, according to the LOID list in each type, fuse the LRFS of each type into a local-fusion feature of each local object. In some embodiments, the local-object feature extraction and fusion module 1312 may perform the context-retrieving process and context-fusion process of each type to generate a fused-context region. In addition, the local-object feature extraction and fusion module 1312 may also fuse each type of ROI to generate a fused ROI.

In block 958, the local-object recognition (LOR) is performed. For example, the local-object recognition model 1313 may perform the local-object-identity recognition to generate an LIID list for each type. The computation apparatus 120 may input each type of local-fusion feature from block 956 to the local-object recognition model 1313 to perform a local-object-identity-recognition process, label the recognition result with an LIID, and merge each LIID to generate an LIID list. In an embodiment, the local-object recognition model 1313 may feed the recognition result of the local-object recognition in each type back to the local-object detection and correspondence module 1311 via a feedback path (e.g., arrow 959), such that the local-object detection and correspondence module 1311 may perform self-learning according to the recognition result of the local-object recognition in each type.

In block 960, a global-object-correspondence (GOC) process is performed. For example, the global-object-and-feature-set correspondence module 1321 may, according to the LOID list and LRFS from block 954 and the LIID list from block 958, perform the global-object correspondence process to generate a GOID list and GRFS.

In block 962, a global-detail-feature-correspondence process is performed. For example, the global-object-and-feature-set correspondence module 1321 may perform the global-detail-feature-correspondence process to generate a GDFS according to the GOID list and GRFS from block 960, the LIID list from block 958, and the fused-context region and fused ROI of each type from block 956.

In block 964, a global-detail-feature-fusion (GDFF) process is performed. For example, the global-detail-feature fusion module 1324 may perform the GDFF process according to the weighting coefficient output from the weighting-coefficient-selection module 1323, such as fusing the GDFS in each type generated by the global-object-and-feature-set correspondence module 1321 into a global-fusion feature (GFF). The weighting coefficient may be the AWC or ADWC, depending on the results of the global-context analysis, and the details can be referred to in the embodiments of FIGS. 8C-1~8C-2 and 9B-1~9B-2.

In block 966, a global-object-recognition (GOR) process is performed. For example, the global-recognition module 133 may input the global-fusion feature generated by the global-detail-feature fusion module 1324 to a global-object-recognition model to recognize the global identity of each global-fusion feature, such as building a GIID list recording the GIID of each global-fusion feature. In addition, the GIID list further records the recognition result and its confidence level of the global-object-recognition model. The computation apparatus 120 may decompose the global-detail feature (GDF) to obtain local-detail features in different types, and feed the local-detail features back to the LOR models via a feedback path 967.

In some embodiments, in a dark environment lacking light, the tone of a person's speech can be heard by the ear (e.g., using the microphones 110B) to determine who is speaking. In some embodiments, the ear may hear a barking sound of an animal to determine whether the sound is from a dog, a cat, or other animals. In the case of having frequent contact with a specific animal and being familiar with its animal sound, it is possible to determine which specific animal is calling by hearing the animal sound, such as the barking sound from a neighbor's dog.

In some embodiments, the surrounding environment can be detected and possible danger can be predicted through odor smell (e.g., using smell sensors 110D), such as smelling smoke, smelling gasoline, etc.

In some embodiments, in a scenario of talking or negotiating with another person, the surveillance system 100 may take the appropriate action by listening to the tone of speech of the person, observing the behavior of the person, and smelling the smell from the person such as alcohol or perfume.

The surveillance system 100 may fuse the sensor information from the different types of sensors (e.g., analogous to different organs), and take the appropriate action after the fusion of the sensor information. Specifically, a portion of the sensors of the surveillance may be not able to detect any noticeable data from the scene monitored by the surveillance system 100. For example, in the dark or low-light environment, the video data captured by the cameras 110A usually does not help to identify the global object. Meanwhile, the computation apparatus 120 may determine that there is no noticeable object in the video data, and it may determine that there is a noticeable object from acoustic data or other types of sensor data. In addition, since some types of detailed features may not help to identify a global object, the context-analysis process performed by the computation apparatus 120 may use the ADWC to perform the global-detail-feature-fusion process. That is, the weighting coefficients of the video-detail features (e.g., including colors, textures, and shapes) associated with the video data are set to 0 to perform the global-detail-feature-fusion process.

Similarly, in another embodiment, the scene monitored by the surveillance system 100 may be a noisy environment, and the acoustic data captured by the microphones 110B may be mixed with various environmental noises. Meanwhile, although the computation apparatus 120 is capable of recognizing a noticeable object in the acoustic data, the recognition may be affected by the noises, resulting in a lower confidence level (or accuracy) for determining the acoustic objects. Thus, the determination result of the context-analysis process performed by the computation apparatus 120 may indicate adapting the ADWC to perform the global-detail-feature-fusion process. That is, the weighting coefficients of the acoustic detail features (e.g., including the sound volume, pitch, and tone) associated with the acoustic data are set to 0 to perform the global-detail-feature-fusion process.

Figure 10:
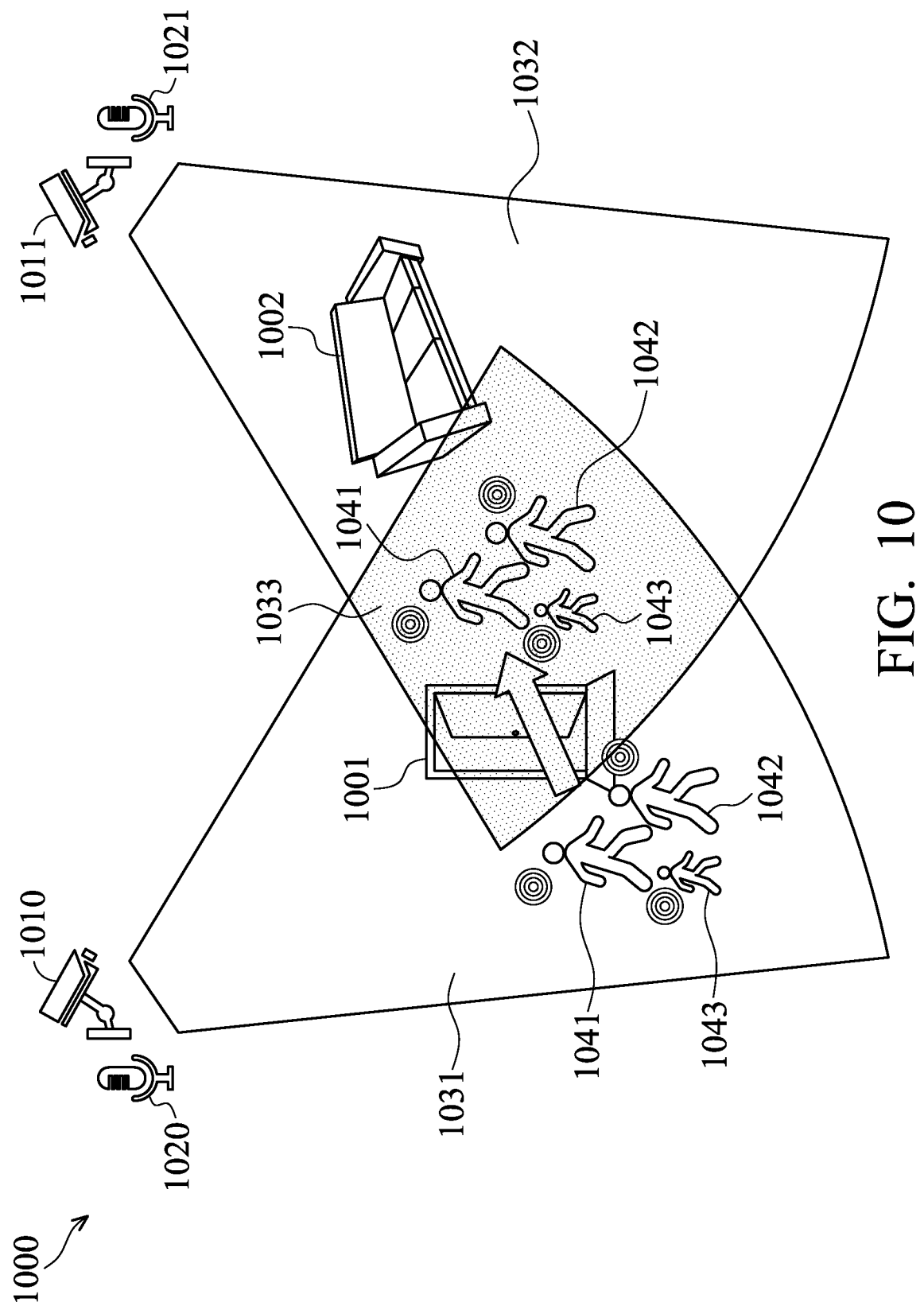
FIG. 10 is a diagram of a scene monitored by the surveillance system in accordance with an embodiment of the disclosure.

FIG. 10 is a diagram of a scene monitored by the surveillance system in accordance with an embodiment of the disclosure.

In the conventional video surveillance system, each camera independently and continuously captures video images and stores them into the hard disks in the video surveillance system. After the cameras are installed, the video surveillance system can instantly display the captured image on the monitor screen that can be monitored by security personnel at any time. If an event occurs, it is necessary to manually access the video file stored in the hard disk. However, due to factors of shooting angles and the installation positions of the cameras, it is also necessary to manually track the images captured by the different cameras. Because the information between the independent cameras cannot be immediately integrated and communicated and the ability for cross-type sensing and fusion analysis is also lacking, it is easy to be affected by conditions of light interference, obscuration, overlapping objects, etc. Thus, complete information of the scene cannot be obtained, resulting in partial recognition and uncertain recognition results.

The surveillance system 100 of the present disclosure is capable of solving the aforementioned problem. As depicted in FIG. 10, scene 1000, for example, is an area near a bank gate, wherein a camera 1010 and a directional microphone 1020 are installed on the bank gate to monitor the entry and exit of the bank gate 1001, and this area is defined as, for example, the first area 1031. After entering the bank through the bank gate 1001, there is a customer-waiting area in which a sofa 1002 is placed. A camera 1011 and a directional microphone 1021 are installed in the customer-waiting area for monitoring the range from the bank gate 1001 to the bank lobby and the customer-waiting area, and the monitoring range is defined as the second area 1032. There is an overlapping area between the first area 1031 and the second area 1032, and the overlapping area is defined as the third area 1033. The cameras 1011~1011 and microphones 1021~1021 are capable of monitoring the third area 1033.

The locations of each type of the sensors in the surveillance system 100 and the scene which is being monitored by the cameras and microphones may have their own world-positioning-coordinate information. The positions of all detected objects can be converted to corresponding world-positioning coordinates. In addition, the information collected by all sensors can be transmitted to a central data-processing center (not shown). The central data-processing center is capable of performing the method described in the aforementioned embodiments in the disclosure to fuse the sensor data of the different types of sensors via an artificial intelligence (AI) system, and generate feedback information for self-training to enhance the capability and accuracy of object detection and recognition.

For example, there are three people going to the bank gate 1001 and enter the first area 1031, they will be detected by the camera 1010 and the directional microphone 1020, and the computation apparatus 120 may perform the method described in the aforementioned embodiments to build labels ID #01, ID #02, and ID #03 on the people 1401, 1042, and 1043, respectively. In addition, the computation apparatus 120 may perform detail-feature extraction on the captured video data and acoustic data of the people 1041, 1042, and 1043. For example, the video detail features may include the color, texture, and shape, and the acoustic detail features may include the sound volume, pitch, and tone.

The video detail features corresponding to the label ID #01 of the person 1041 include: black, no stripes, adult, and female, and the acoustic detail features may include: loud, noisy, and clear. The video detail features corresponding to the label ID #02 of the person 1042 include: blue, no stripes, adult, and male, and the acoustic detail features may include: medium volume, deep, and full. The video detail features corresponding to the label ID #03 of the person 1043 include: black, horizontal stripes, and child, and the acoustic detail features may include: loud, bright and clear, and vibrant.

Referring to FIGS. 9A-1~9A-2 and FIG. 10, specifically, when the people 1041, 1042, and 1043 are located in the first area 1031, the computation apparatus 120 may capture the video detail features and acoustic detail features corresponding to the labels ID #01, ID #02, and ID #03 corresponding to the people 1041, 1042, and 1043, and the video detail features and acoustic detail features are input to respective local-object-recognition models (e.g., blocks 906-1 and 906-2), and generate a recognition result of the respective video object and acoustic object, such as the LIID list L1 for the video object and the LIID list L2 for the acoustic object.

Then, the global-object-correspondence process in block 908 and the GDFS-correspondence process in block 910 are performed to generate an LIID list, and a GRFS and corresponding GDFS. Assuming that the AWC is adapted in block 912, the LIID list, and the GRFS and corresponding GDFS are used in block 918 to perform the global-detail-feature-fusion to generate a global-fusion feature. Then, the global-object-recognition model in block 920 generates a recognition result. For example, global objects P1, P2, and P3 are recognized, and the GIIDs GIID1, GIID2, and GIID3 are assigned to the recognized global objects P1, P2, and P3.

Briefly, the global objects corresponding to the GIIDs GIID1, GIID2, and GIID3 may carry all video detail features and acoustic detail features corresponding to the labels ID #01, ID #02, and ID #03, respectively.

Accordingly, when the people 1041, 1042, and 1043 enter the first area 1031, the computation apparatus 120 has built the labels ID #01, ID #02, and ID #03, global identity identifiers GIID1, GIID2, and GIID3, and all video detail features and acoustic detail features corresponding to the people 1041, 1042, and 1043, respectively.

When the people 1041, 1042, and 1043 enter the third area 1033 from the first area 1031, the third area 1033 is monitored simultaneously by cameras 1011~1011 and directional microphones 1020~1021. While the people 1041, 1042, and 1043 are entering the third area 1033 from the first area 1031, the camera 1010 and the directional microphone 1020 may continuously collect video data and acoustic data for object racking and recognition. However, a portion of the feature information may be missing due to the installation positions and angles of the sensors, the light and background sounds of the environment, or the overlapping of the people. Accordingly, after the people 1041, 1042, and 1043 have entered the third area 1033 from the first area 1031, in addition to using the video data and acoustic data captured by the camera 1010 and directional microphone 1020, the computation apparatus 120 may also use the video data and acoustic data captured by the camera 1011 and directional microphone 1021 at different positions and angles to build the global-fusion feature of each global object according to the aforementioned steps. Additionally, the computation apparatus 120 is capable of fusing the feature data collected by the camera 1010 and directional microphone 1020. The global-object-recognition model in block 920 can be used to determine whether the global-fusion feature matches that of the previously recognized global objects corresponding to the GIIDs GIID1, GIID2, and GIID3. If the global-fusion features match, it is determined that the same person is detected. If the global-fusion features do not match, it is determined that a different person is detected.

When the people 1041, 1042, and 1043 have left the third area 1033 and enter the second area 1032, the computation apparatus 120 is only capable of using the video data and acoustic data captured by the camera 1011 and directional microphone 1021 to build the global-fusion feature of each global object according to the aforementioned steps. The global-object-recognition model in block 920 can be used to determine whether the global-fusion feature matches that of the previously recognized global objects corresponding to the GIIDs GIID1, GIID2, and GIID3. If the global-fusion features match, it is determined the same person is detected. If the global-fusion features do not match, it is determined that a different person is detected. Accordingly, the information used by the surveillance system in the present disclosure is richer and more complete than that used by the conventional surveillance system, and the surveillance system in the disclosure includes a feedback and enhancement mechanism capable of significantly improving the ability and accuracy of tracking and recognition.

Figure 11:
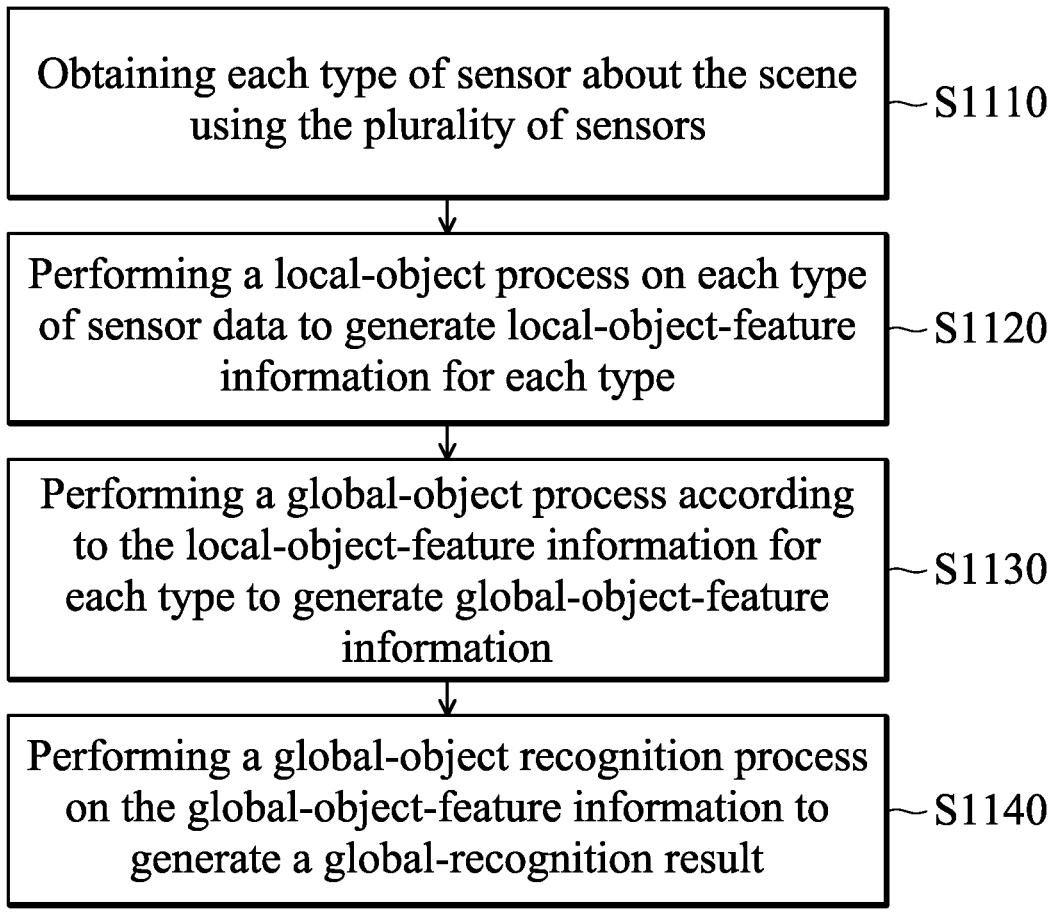
FIG. 11 is a flow chart of a surveillance method using multi-dimensional data in accordance with an embodiment of the disclosure.

FIG. 11 is a flow chart of a surveillance method using multi-dimensional data in accordance with an embodiment of the disclosure.

Referring to FIG. 2 and FIG. 11, in step S1110, each type of sensor data about the scene is obtained by the different types of sensors (e.g., sensors 110A-110E). For example, the sensors 110 include different types of sensors, such as cameras 110A, microphones 110B, taste sensors 110C, smell sensors 110D, tactile sensors 110E, or a combination thereof, but the disclosure is not limited to the sensors of the aforementioned types or attributes.

In step S1120, a local-object process is performed on each type of sensor data to generate local-object-feature information for each type. For example, the local-object process may include various processes performed by the local-object detection and correspondence module 1311, the local-object feature extraction and fusion module 1312, and the local-object recognition model 1313. In addition, the local-object-feature information generated by the local-object-recognition module 131 includes an LIID list, LRFS, LFF, and LIID list for each type.

In step S1130, a global-object process is performed according to the local-object-feature information to generate global-object-feature information. For example, the global-object process includes various processes performed by the global-object-and-feature-set correspondence module 1321, the context-region-analysis module 1322, the weighting-coefficient-selection module 1323, and the global-detail-feature fusion module 1324. In addition, the global-object-feature information generated by the feature-fusion module 132 includes the GOID list and corresponding GDFS, and the global-fusion feature.

In step S1140, a global-object-recognition process is performed on the global-object-feature information to generate a global-recognition result. For example, the global-recognition module 133 may input the global-fusion feature generated by the global-detail-feature-fusion module 1324 into a global-object-recognition model to recognize the global identity of each global-fusion feature, such as building a GIID list recording the GIID of each global-fusion feature.

In view of the above, a surveillance system and a surveillance method using multi-dimensional data are provided. The surveillance system and the surveillance method are capable of obtaining sensor data by sensors in different types, performing detection, correspondence, and recognition of local objects in each type, and generating a global object having a global-fusion feature by corresponding different types of local objects. In addition, the surveillance system and surveillance method using multi-dimensional sensor data in the disclosure are further capable of performing global-object recognition to improve the reliability and accuracy for monitoring objects in the scene.

While the disclosure has been described by way of example and in terms of the preferred embodiments, it should be understood that the disclosure is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A surveillance method using multi-dimensional sensor data, for use in a surveillance system, wherein the surveillance system comprises a plurality of sensors installed within a scene, and the plurality of sensor are classified into a plurality of types, the surveillance method comprising:
   obtaining each type of sensor data about the scene using the plurality of sensors;
   performing a local-object process on each type of the sensor data to generate local-object-feature information for each type;

performing a global-object process according to the local-object-feature information for each type to generate global-object-feature information; and performing a global-object recognition process on the global-object-feature information to generate a global-recognition result, wherein the performing the local-object process on each type of sensor data to generate local-object-feature information comprises:

performing a local-object detection and correspondence process on each type of sensor data to obtain a local-object-identifier (LOID) list and a corresponding local-rough-feature set (LRFS) for each type;

performing a local-feature-extraction-and-fusion process on each type of sensor data according to the LOID list and the corresponding LRFS for each type to obtain a plurality of local-detail-feature sets (LDFS), and fusing the plurality of LDFSs into a local-fusion feature; and inputting each type of the local-fusion feature into a local-object-recognition model to obtain a local-identity-identifier (LIID) list for each type.

2. The surveillance method as claimed in claim 1, wherein the sensors comprise: cameras, microphones, taste sensors, smell sensors, tactile sensors, or a combination thereof.

3. The surveillance method as claimed in claim 1, wherein the LIID list for each type comprises one or more local objects of each type, and each object has a corresponding local-object identifier (LOID), wherein the LRFS comprises direction, distance, and roughness of each type of local object.

4. The surveillance method as claimed in claim 3, wherein the local-object-feature extraction and fusion process comprises:

extracting a plurality of local-detail features to build a local-detail-feature set (LDFS) according to the LIID list and corresponding LRFS of each type; and fusing each type of LDFS into the local-fusion feature of each local object.

5. The surveillance method as claimed in claim 1, wherein the local-object-feature information comprises the LOID list, the LRFS, the LFF, and the LIID list for each type, and the performing the global-object process according to the local-object-feature information of each type to generate the global-object-feature information comprises:

performing a global-object-correspondence process according to the local-object-feature information to generate a global-object-identifier (GOID) list and a corresponding global-rough-feature set (GRFS); and performing a global-detail-feature-correspondence process according to the local-object-feature information, wherein the GOID list and the corresponding GRFS generate a global-detail-feature set (GDFS) for each of one or more global objects in the GOID list.

6. The surveillance method as claimed in claim 5, wherein the performing the global-object recognition process on the global-object-feature information to generate the global-recognition result comprises:

performing a local-context-analysis process on each type of sensor data to generate a local-context-analysis result for each type, and merging the local-context-analysis result of each type to generate a local-context-merged result;

selecting an adjacent-differential-weighting coefficient (ADWC) or an adaptive-weighting coefficient (AWC) according to the local-context-merged result; and performing a global-detail-feature-fusion process according to the selected ADWC or AWC to perform a global-detail-feature-fusion process to generate a global-fusion feature corresponding to each global object.

7. The surveillance method as claimed in claim 6, wherein the global-recognition result comprises a confidence level, and the surveillance method further comprises:

decomposing the global-fusion feature into a plurality of local-detail features of different types; and feeding each type of local-detail feature and its corresponding confidence level back to the local-object-recognition model for each type.

8. The surveillance method as claimed in claim 6, wherein the local-context-analysis process comprises:

performing a context-retrieving process on each type of sensor data to obtain a context-region for each type;

performing a context-merging process on each type of context region to obtain a merged-context region for each type;

performing the local-context-analysis process on each type of merged-context region to generate the local-context-analysis result; and combining each of the local-context-analysis results to generate the combined local-context result.

9. The surveillance method as claimed in claim 1, further comprising:

when time stamps, the LRFS, and world-positioning-coordinate information of the local object of each type match each other, determining that the local objects successfully match each other; and assigning a global-object-identifier to the successfully matched local objects.

10. A surveillance system, comprising:

a plurality of sensors, wherein the plurality of sensors are classified into a plurality of types and are configured to monitor a scene to obtain sensor data of each type; and a computation apparatus, configured to perform a local-object process on each type of sensor data to generate local-object-feature information;

wherein the computation apparatus is configured to perform a global-object process according to the local-object-feature information of each type to generate global-object-feature information, and perform a global-object recognition process on the global-object-feature information to generate a global-recognition result, wherein the computation apparatus is further configured to:

perform a local-object detection and correspondence process on each type of sensor data to obtain a local-object-identifier (LOID) list and a corresponding local-rough-feature set (LRFS) for each type;

perform a local-feature-extraction-and-fusion process on each type of sensor data according to the LOID list and the corresponding LRFS of each type to obtain a plurality of local-detail-feature sets (LDFS), and fuse the plurality of LDFSs into a local-fusion feature; and input each type of local-fusion feature into a local-object-recognition model to obtain a local-identity-identifier (LIID) list for each type.

11. The surveillance system as claimed in claim 10, wherein the sensors comprise: cameras, microphones, taste sensors, smell sensors, tactile sensors, or a combination thereof.

12. The surveillance system as claimed in claim 10, wherein the LIID list in each type comprises one or more local objects of each type, and each object has a corresponding local-object identifier (LOID),
wherein the LRFS comprises direction, distance, and roughness of each local object of each type.

13. The surveillance system as claimed in claim 12, wherein the computation apparatus is further configured to:
extract a plurality of local-detail features to build a local-detail-feature set (LDFS) according to the LIID list and corresponding LRFS of each type, and fuse the LDFS of each type into the local-fusion feature of each local object.

14. The surveillance system as claimed in claim 10, wherein the local-object-feature information comprises the LOID list, the LRFS, the LFF, and the LIID list in each type, and the computation apparatus is further configured to:
perform a global-object-correspondence process according to the local-object-feature information to generate a global-object-identifier (GOID) list and a corresponding global-rough-feature set (GRFS), and perform a global-detail-feature-correspondence process according to the local-object-feature information, and the GOID list and corresponding GRFS generate a global-detail-feature set (GDFS) for each of one or more global objects in the GOID list.

15. The surveillance system as claimed in claim 14, wherein the computation apparatus is further configured to:
perform a local-context-analysis process on each type of sensor data to generate a local-context-analysis result for each type, and merge the local-context-analysis result of each type to generate a local-context-merged result, and select an adjacent-differential-weighting coefficient (ADWC) or an adaptive-weighting coefficient (AWC) according to the local-context-merged result; and
perform a global-detail-feature-fusion process according to the selected ADWC or AWC to perform a global-detail-feature-fusion process to generate a global-fusion feature corresponding for each global object.

16. The surveillance system as claimed in claim 15, wherein the global-recognition result comprises a confidence level, and the computation apparatus is further configured to:
decompose the global-fusion feature into a plurality of local-detail features of different types, and feed each type of local-detail feature and its corresponding confidence level back to the local-object-recognition model for each type.

17. The surveillance system as claimed in claim 15, wherein the computation apparatus is further configured to:
perform a context-retrieving process on each type of sensor data to obtain a context-region for each type, and perform a context-merging process on each type of context region to obtain a merged-context region for each type; and
perform the local-context-analysis process on each type of merged-context region to generate the local-context-analysis result, and combine each of the local-context-analysis results to generate the combined local-context result.

18. The surveillance system as claimed in claim 10, wherein when time stamps, the LRFS, and world-positioning-coordinate information of the local object in each type match, the computation apparatus is further configured to:
determine that the local objects are successfully matched, and assign a global-object-identifier to the successfully matched local objects.

* * * * *